US010200908B2

(12) United States Patent
Chandramouli et al.

(10) Patent No.: US 10,200,908 B2
(45) Date of Patent: Feb. 5, 2019

(54) METHODS, APPARATUS, A SYSTEM, AND A RELATED COMPUTER PROGRAM PRODUCT FOR ACTIVATION AND DEACTIVATION OF BEARERS

(75) Inventors: Devaki Chandramouli, Plano, TX (US); Rainer Liebhart, Munich (DE); Wei Lu, Beijing (CN); Xiao Tang Xie, Beijing (CN); Robert Zaus, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/124,861

(22) PCT Filed: Jun. 16, 2011

(86) PCT No.: PCT/US2011/040609
§ 371 (c)(1),
(2), (4) Date: Dec. 9, 2013

(87) PCT Pub. No.: WO2012/173623
PCT Pub. Date: Dec. 20, 2012

(65) Prior Publication Data
US 2014/0105011 A1   Apr. 17, 2014

(51) Int. Cl.
*H04W 28/02* (2009.01)
*H04W 76/30* (2018.01)
*H04W 76/11* (2018.01)
*H04W 4/08* (2009.01)
*H04W 72/12* (2009.01)
(Continued)

(52) U.S. Cl.
CPC ......... *H04W 28/0252* (2013.01); *H04W 4/08* (2013.01); *H04W 60/00* (2013.01); *H04W 60/06* (2013.01); *H04W 72/121* (2013.01); *H04W 76/11* (2018.02); *H04W 76/30* (2018.02); *H04W 4/70* (2018.02)

(58) Field of Classification Search
None
See application file for complete search history.

(56) References Cited

U.S. PATENT DOCUMENTS 7,450,534 B2   11/2008   Kim et al.
8,514,756 B1 *  8/2013   Ramachandra et al. ...... 370/310
(Continued)

FOREIGN PATENT DOCUMENTS

WO   2011/047589 A1   4/2011

OTHER PUBLICATIONS

ZTE, "The group bearer for MTC", Feb. 2010. 3GPP.*
(Continued)

*Primary Examiner* — Peter P Chau
(74) *Attorney, Agent, or Firm* — Squire Patton Boggs (US) LLP

(57) ABSTRACT

Methods, apparatuses, system and computer program product for activation and/or deactivation of bearers for a group of devices are disclosed. The method comprises receiving an attach request for a device belonging to a group of devices, obtaining an identity of the group of devices, allocating a first bearer identity for the group of devices, and sending the identity of the group and the first bearer identity to a first network element, wherein the first network element is involved in transmission of user data of the group of devices.

17 Claims, 23 Drawing Sheets

(51) Int. Cl.
   *H04W 60/00*   (2009.01)
   *H04W 60/06*   (2009.01)
   *H04W 4/70*    (2018.01)

(56) References Cited

U.S. PATENT DOCUMENTS

| | | | |
|---|---|---|---|
| 2008/0320149 | A1 | 12/2008 | Faccin |
| 2009/0042570 | A1 | 2/2009 | Hurtta |
| 2009/0111428 | A1* | 4/2009 | Blommaert et al. .......... 455/411 |
| 2010/0029277 | A1 | 2/2010 | Ekstrom et al. |
| 2010/0103863 | A1 | 4/2010 | Ulupinar et al. |
| 2011/0040855 | A1 | 2/2011 | Miklos et al. |
| 2011/0110379 | A1 | 5/2011 | Lim et al. |
| 2011/0122845 | A1 | 5/2011 | Meirosu et al. |
| 2012/0039304 | A1* | 2/2012 | Kim ............... H04W 28/08 370/332 |
| 2012/0170502 | A1* | 7/2012 | Korus ............. H04W 4/06 370/312 |
| 2012/0202491 | A1* | 8/2012 | Fox ............... H04B 7/2609 455/435.1 |
| 2012/0246325 | A1* | 9/2012 | Pancorbo Marcos ........ H04L 63/102 709/227 |
| 2012/0294163 | A1* | 11/2012 | Turtinen ......... H04W 72/042 370/252 |
| 2013/0051231 | A1* | 2/2013 | Cai et al. .............. 370/230 |
| 2013/0064158 | A1* | 3/2013 | Sundell ............. H04W 76/02 370/311 |
| 2013/0155948 | A1* | 6/2013 | Pinheiro et al. ............ 370/328 |

OTHER PUBLICATIONS

TD S2-100094; ZTE; "The group bearer for MTC"; 3GPP TSG SA WG2 Meeting #77; Jan. 18-22, 2010, Shenzhen, China.

European Search Report Application No. 11867844.0 dated Nov. 14, 2014.

3GPP TR 23.888 V1.3.0 (Jun. 2011); 3rdGeneration Partnership Project; Technical Specification Group Services and System Aspects; System Improvements for Machine-Type Communications; (Release 11).

European Search Report application No. 11867844.0 dated May 4, 2015.

International Search Report and Written Opinion dated Jan. 12, 2012 corresponding to International Patent Application No. PCT/US2011/040609.

3GPP TS 23.060 V10.4.0 (Jun. 2011), Technical Specification, 3rd Generation Partnership Project; Technical Specification Group Services and System Aspects; General Packet Radio Service (GPRS); Service description; Stage 2 (Release 10), Jun. 2011, 321 pages.

* cited by examiner

METHODS, APPARATUS, A SYSTEM, AND A RELATED COMPUTER PROGRAM PRODUCT FOR ACTIVATION AND DEACTIVATION OF BEARERS

FIELD OF THE INVENTION

The present invention relates to activation and deactivation of bearers for a group of devices in communication networks. More specifically, the present invention relates to methods, apparatuses, a system, a related computer program product for activation and deactivation of bearers for a group of devices in communication networks.

BACKGROUND

The evolved packet system (EPS) is an end-to-end system that provides a new radio access network, referred to as the evolved Universal Terrestrial Radio Access Network (E-UTRAN) or long term evolution (LTE), and a new packet core network, referred to as the evolved packet core (EPC), for broadband wireless data access. The EPC can also be used in conjunction with other radio access networks such as the GERAN (Global System for Mobile Communications (GSM) Enhanced Data rates for Global Evolution (EDGE) Radio Access Network) and the UTRAN. The EPC comprises a mobility management entity (MME), a packet data network (PDN) gateway (PDN-GW or shortly, P-GW) and a serving gateway (S-GW). In order to provide connectivity to packet data networks, end-to-end EPS bearers are established. An EPS bearer is a logical aggregate of one or more service data flows (SDFs) or internet protocol (IP) flows extending from a user equipment (UE) to a PDN gateway. All service data flows within a bearer receive the same level of quality of service (QoS). An EPS bearer is a collection of a radio bearer extending from a UE to an enhanced node B (eNB), an S1 bearer extending from an eNB to an S-GW across an S1 interface and an S5/S8 bearer extending from the S-GW to a P-GW across an S5/S8 interface. There is a one-to-one mapping between the radio, S1 and S5/S8 bearers.

It is expected that the number of so-called machine type communication devices (MTC devices) using similar applications and having, e.g., similar QoS needs will dramatically increase in the coming years. These devices behave often in a similar way, e.g. smart meters sending small amount of data once a day to a server, accessing the network almost simultaneously. Besides machine type devices, broadcast or multicast services such as mobile television (mobile TV) or video streaming and peer-to-peer services such as interactive gaming have often similar requirements on the usage of network resources. Establishing EPS bearers for each device requires an enormous amount of network resources and signaling. Also, performing policy/QoS control and charging individually for each device and each session at the P-GW leads to a huge load at the P-GW and policy control elements, such as e.g., a Policy and charging rules function (PCRF), present in the network.

Similar problems arise when several devices attached to the network need to be detached, e.g., due to network congestion leading to a network initiated detach or due to a device initiated detach. In either case, several bearers may need to be deactivated at the same time and this will lead to an enormous amount of signaling.

SUMMARY

In consideration of the above, it is an object of examples of the present invention to overcome one or more of the above drawbacks. In particular, the present invention provides methods, apparatuses, a system, and a related computer program product for optimizing bearer activation, deactivation and detach procedures in communication networks.

According to a first embodiment of the present invention, there is provided a method comprising receiving an attach request for at least one device belonging to a group of devices, obtaining an identity of the group of devices, and allocating a first bearer identity for the group of devices.

The first bearer identity may comprise a new bearer identity for the group of devices. Alternatively, the first bearer identity may comprise a previously allocated bearer identity for the group of devices.

The previously allocated bearer identity may comprise a bearer identity allocated by a first or second control node upon receiving an attach request for another device belonging to the group of devices. The first control node may comprise a control node receiving the attach request for the at least one device, whereas the second control node may comprise a control node receiving the attach request for the other device.

The method of the first embodiment may further comprise obtaining the previously allocated bearer identity from the second control node. Alternatively, the previously allocated bearer identity may be obtained from a first network element, wherein the first network element may be involved in a transmission of user data of the group of devices.

The first and second control node may comprise any of a mobility management entity and a serving general packet radio service support node.

The identity of the group of devices may be obtained, according to the first embodiment, from the attach request. Alternatively, the identity of the group of devices may be obtained from a home subscriber server.

The attach request may be received, according to the first embodiment, from the at least one device. Alternatively, the attach request may be received from a master device responsible for communicating to at least one of the first and second control node for the group of devices.

The method of the first embodiment may further comprise sending the identity of the group of devices and the first bearer identity to the first network element.

The attach request received, according to the first embodiment, may further comprise an identity of the at least one device. The method according to the first embodiment may further comprise allocating a second bearer identity for the at least one device, and sending the identity of the at least one device and the second bearer identity to the first network element.

The method of the first embodiment may further comprise obtaining an identity of a sub-group of devices, wherein the sub-group of devices may comprise the at least one device, and the sub-group of devices belong to the group of devices. The method may further comprise allocating a third bearer identity for the sub-group of devices, and sending the identity of the sub-group of devices and the third bearer identity to the first network element.

Further, the method of the first embodiment may comprise sending to a second network element any of the following:
the identity of the group of devices and the first bearer identity;
the identity of the at least one device and the second bearer identity; and
the identity of the sub-group of devices and the third bearer identity.

The second network element may comprise a network element involved in transmission of user data of the group of devices.

The method, according to the first embodiment, may further comprise creating a group bearer using the first bearer identity for transmission of user data of the group of devices across a first interface, and mapping the group bearer to at least one bearer across a second interface, wherein the at least one bearer may be created using any of first, second and third bearer identities. The at least one bearer across a second interface may comprise any one of the following:
- a bearer that may transmit user data of the group of devices;
- at least one bearer that may transmit user data of the sub-group of devices; and
- at least one bearer that may transmit user data of the at least one device.

The first and/or second interface may comprise any one of:
- an S1 interface;
- a Iu interface;
- an S4 interface;
- an S12 interface
- a Iu-PS interface;
- an S5 interface;
- an S8 interface;
- a Gn interface;
- a Gi interface; and
- an SGi interface.

The method of the first embodiment may further comprise forwarding to a third network element any of the following:
- the identity of the group of devices and the first bearer identity;
- the identity of the at least one device and the second bearer identity; and
- the identity of the sub-group of devices and the third bearer identity.

The third network element may comprise a gateway to a packet data network.

The method of the first embodiment may further comprise defining at least one of a group tunnel end point identifier for the group bearer and an individual tunnel end point identifier for the individual bearer, and sending the at least one of a group tunnel end point identifier and an individual tunnel end point identifier to at least one of first, second and third network elements.

The method of the first embodiment may further comprise defining an aggregate maximum bit rate for the group bearer, and performing policy control based on the aggregate maximum bit rate.

The method of the first embodiment may further comprise defining a charging identifier for the group of devices associated with the bearer, and performing charging for the group bearer.

Any of the first, second and third network elements may comprise any one of a base station controller, radio network controller, enhanced node-B, serving gateway, packet data network gateway, serving general packet radio service support node and gateway general packet radio service support node.

According to a second embodiment of the invention, there is provided a method comprising sending at least one request to detach at least one device belonging to a group of devices, and sending a request to delete a session for the at least one device to a network element, wherein the request to delete a session comprises at least one bearer identity for the at least one device. The at least one request to detach may be sent to a master device associated with the group of devices. The network element may comprise a serving gateway. The at least one bearer identity may comprise a linked identity of a group bearer for the group of devices. Alternatively, the at least one bearer identity may comprise at least one linked identity of at least one individual bearer for the at least one device. The request to detach may comprise an identity of the group of devices. Alternatively, the request to detach may comprise identities of the at least one device.

According to a third embodiment of the invention, there is provided a method comprising receiving at least one request to detach at least one device belonging to group of devices, and sending a request to delete a session for the at least one device to a network element, wherein the request to delete a session comprises at least one bearer identity for the at least one device. The at least one request to detach may be received from a master device associated with the group of devices. The network element may comprise a serving gateway. The at least one bearer identity may comprise a linked identity of a group bearer for the group of devices. Alternatively, the at least one bearer identity may comprise at least one linked identity of at least one individual bearer for the at least one device. The request to detach may comprise an identity of the group of devices. Alternatively, the request to detach may comprise identities of the at least one device.

According to a fourth embodiment of the invention, there is provided a method comprising receiving a delete session request comprising an identity of a bearer and identities of a plurality of devices to be detached, determining if the plurality of devices comprises all the devices associated with the bearer, and deactivating the bearer if the result of the determining is positive. The method may further comprise removing a mapping between the plurality of devices and the bearer if the result of the determining is negative.

According to a fifth embodiment of the invention, there is provided a method comprising receiving an attach request from a device belonging to a group of devices, obtaining an identity of the group of devices, allocating a first bearer identity for the group of devices, sending the identity of the group of devices and the first bearer identity to a first network element, receiving a request to detach the group of devices, and sending a request to delete a session for the group of devices to the first network element, wherein the request to delete the session comprises the first bearer identity.

According to sixth embodiment of the invention, there is provided a system comprising a plurality of bearers for transmitting user data across any of the interfaces comprising:
- an S1 interface;
- a Iu interface;
- an S4 interface;
- an S12 interface
- a Iu-PS interface;
- an S5 interface;
- an S8 interface;
- a Gn interface;
- a Gi interface; and
- an SGi interface;

wherein at least one bearer across any of the interfaces comprises a group bearer transmitting user data of devices of a group requiring identical quality of service.

The at least one bearer may be mapped to any of the following:

plurality of radio bearers each transmitting user data for a device of the group; and plurality of bearers across any other interface each transmitting user data for a device of the group.

The devices of the group may comprise machine type communication devices.

According to a seventh embodiment of the invention, there is provided an apparatus comprising means for receiving, or an input unit configured to receive, an attach request for a device belonging to a group of devices, means for obtaining, or an obtaining unit configured to obtain, an identity of the group of devices, means for allocating, or an allocating unit configured to allocate, a first bearer identity for the group of devices; and means for transmitting, or an output unit configured to transmit, the identity of the group of devices and the first bearer identity.

The apparatus of the seventh embodiment may further comprise means for receiving an identity of the device, means for allocating a second bearer identity for the device, and means for transmitting the identity of the device and the second bearer identity.

The apparatus of the seventh embodiment may further comprise means for receiving an identity of a sub-group of devices, means for allocating a third bearer identity for the sub-group of devices, and means for transmitting the identity of the sub-group of devices and the third bearer identity. The sub-group of devices belongs to the group of devices and the device belongs to the sub-group of devices.

Further, the apparatus may comprise means for receiving any of the first, second and third bearer identities from a control node or a serving gateway. The control node may comprise a mobility management entity or a serving general packet radio service support node.

The apparatus of the seventh embodiment may comprise any of a mobility management entity and a serving general packet radio service support node.

According to an eighth embodiment of the invention, there is provided an apparatus comprising means for receiving, or an input unit configured to receive, at least one first request to detach at least one device belonging to a group of devices, and means for transmitting, or an output unit configured to transmit, a second request to delete a session for the at least one device, wherein the second request comprises at least one bearer identity for the at least one device.

The means for receiving may comprise means for receiving from a master device responsible for communicating for the at least one device.

The apparatus of the eighth embodiment may comprise any of a mobility management entity and a serving general packet radio service support node.

According to a ninth embodiment of the invention, there is provided an apparatus comprising means for transmitting, or an output unit configured to transmit, at least one first request to detach at least one device belonging to a group of devices, and means for transmitting, or the output unit configured to transmit, a second request to delete a session for the at least one device, wherein the second request comprises at least one bearer identity for the at least one device. The means for transmitting may comprise means for transmitting to a master device responsible for communicating for the at least one device.

The apparatus of the ninth embodiment may comprise any of a mobility management entity and a serving general packet radio service support node.

According to a tenth embodiment of the invention, there is provided an apparatus comprising means for receiving, or an input unit configured to receive, an identity of a group of devices and a bearer identity; and means for creating, or a creating unit configured to create, a bearer for transmission of user data of the group of devices. The apparatus may further comprise means for assigning, or an assigning unit configured to assign, a tunnel end point identifier for the bearer. The apparatus may further comprise means for defining, or a defining unit configured to define, an aggregate maximum bit rate for the bearer. The apparatus may further comprise means for defining, or the defining unit configured to define, a charging identifier for the group of devices associated with the bearer.

The apparatus of the tenth embodiment may comprise any of an evolved node-B, a serving gateway, and a packet data network gateway.

According to a eleventh embodiment of the invention, there is provided an apparatus comprising means for receiving, or an input unit configured to receive, a delete session request comprising an identity of a bearer and identities of a plurality of devices to be detached, means for determining, or a determining unit configured to determine, if the plurality of devices comprises all the devices associated with the bearer, and means for deactivating, or a deactivating unit configured to deactivate, the bearer if the result of the determining is positive. The apparatus may further comprise means for removing, or a removing unit configured to remove, a mapping between the plurality of devices and the bearer if the result of the determining is negative. The apparatus of the eleventh embodiment may comprise any of an evolved node-B, a serving gateway, and a packet data network gateway.

According to a twelfth embodiment of the invention, there is provide an apparatus comprising means for receiving, or an input unit configured to receive a detach request, wherein the detach request comprises identity of at least one device to be detached, and means for forwarding, or a forwarding unit configured to forward, the detach request to the at least one device, wherein the at least one device belongs to a group of devices.

The apparatus of the twelfth embodiment may belong to the group of devices. Alternatively, the apparatus may comprise a gateway for the group of devices.

According to a thirteenth embodiment of the invention, there is provided an apparatus comprising means for transmitting, or an output unit configured to transmit, a request for temporary identifiers to at least one device, means for receiving, or an input unit configured to receive, the temporary identifiers, and means for transmitting, or the output unit configured to transmit, a detach request for the at least one device, wherein the detach request comprises the temporary identifiers, wherein the at least one device belongs to a group of devices.

The apparatus of the thirteenth embodiment may belong to the group of devices. Alternatively, the apparatus may comprise a gateway for the group of devices.

According to a fourteenth embodiment of the invention, there is provided a system comprising a first apparatus comprising the apparatus of any of seventh, eighth and ninth embodiments, and a second apparatus comprising the apparatus of any of tenth and eleventh embodiments. The system may further comprise a third apparatus comprising the apparatus of any of twelfth and thirteenth embodiments.

According to a fifteenth embodiment of the invention, there is provided a computer program product comprising code means for performing method steps according to any of first to fifth embodiments, when run on a processing means or module.

Embodiments of the present invention may have one or more of the following advantages:
- group policy and charging control
- consolidated content transmission to a group of devices
- simplified policy/QoS control in P-GW
- reduced signaling
- resolving and avoiding network congestion
- positive impact on energy efficiency of core network nodes such as a mobility management entity (MME) or serving GPRS support node (SGSN)
- reduced need for resources in network nodes such as a PDN gateway (P-GW) and home subscriber server (HSS)

DETAILED DESCRIPTION OF THE PRESENT INVENTION

Examples of the present invention are described herein below with reference to the accompanying drawings.

Figure 1:
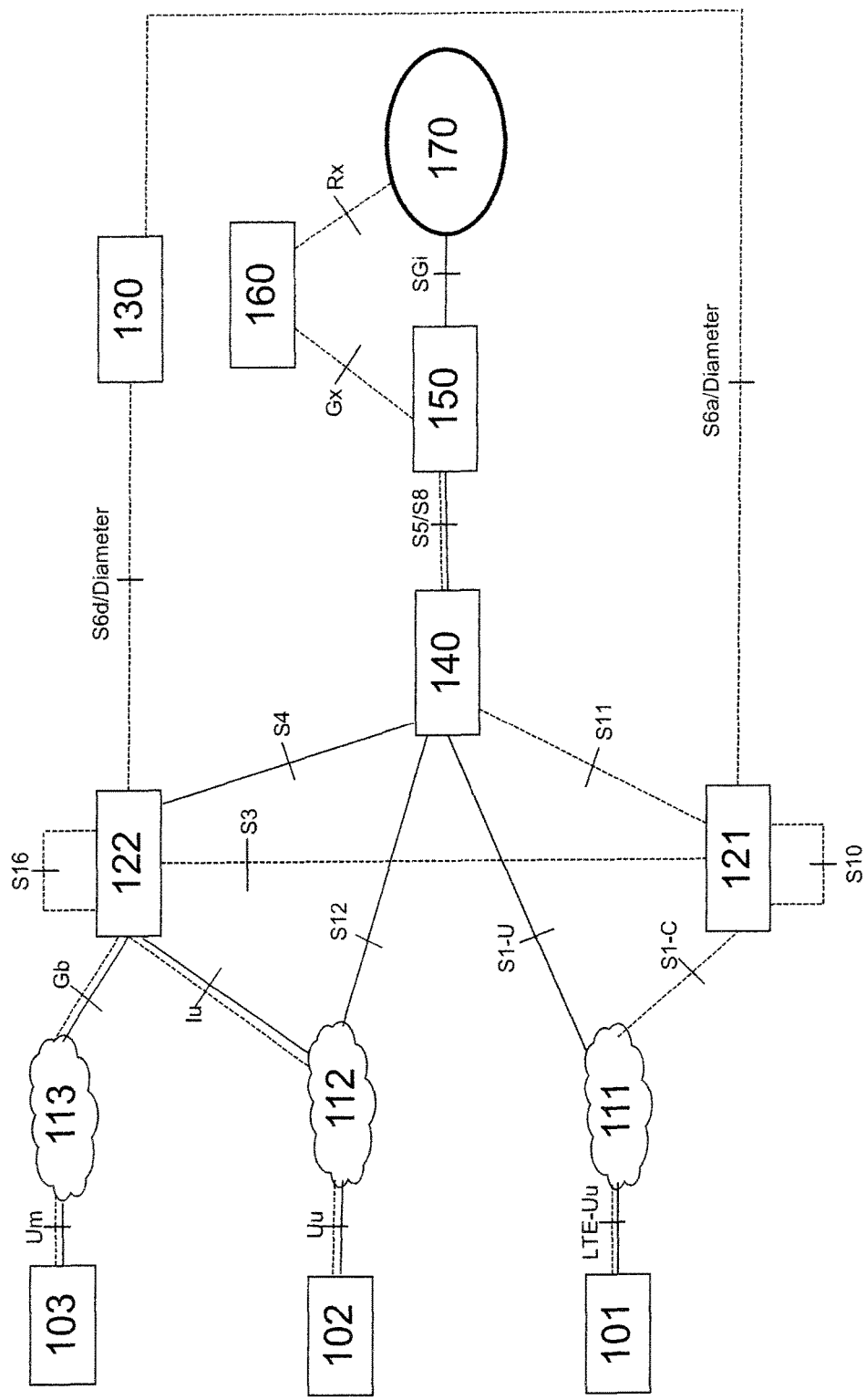
FIG. 1 shows a network architecture wherein the bearer activation and deactivation procedures according to some examples of the present invention may be performed.

FIG. 1 shows a network architecture of an evolved packet system (EPS). In the figure, dotted lines represent connections over control plane, i.e., connections that may carry signaling or control messages, and solid lines represent connections over user plane, i.e., connections that may carry user data.

A user equipment (UE) 101 may connect to an evolved universal terrestrial radio access network (E-UTRAN) 111 over an air interface, e.g., a long term evolution (LTE)-Uu interface defined by Third Generation Partnership Project (3GPP). According to examples of the present invention, the UE 101 may send a attach request to E-UTRAN 111 over the LTE-Uu interface. The UE 101, according to examples of the present invention, may be a machine type communication (MTC) device. The E-UTRAN 111 may comprise an evolved node B (eNB) that may perform radio resource management and user plane internet protocol (IP) header compression and ciphering.

The network architecture of the evolved packet system may further comprise an evolved packet core (EPC). The evolved packet core (EPC) may comprise a mobility management entity (MME) 121, a serving gateway (S-GW) 140 and a packet data network (PDN) gateway (P-GW) 150. The MME 121 is a control or signaling element that may perform selection of gateways, e.g., S-GW 140 and P-GW 150, and control bearer activation and deactivation for the user traffic. The MME 121 may connect to the E-UTRAN 111 over a S1-C interface and to the S-GW 140 over a S11 interface, as defined by 3GPP. According to some examples of the present invention, the E-UTRAN 111 may forward an attach request from a UE 101 to the MME 121 over the S1-C interface. The MME 121 may send create session requests to the S-GW 140 over the S11 interface. Further, the MME 121 may connect to another MME that may be present in the network over a S10 interface defined by 3GPP.

The S-GW 140 is a bearer plane element that may interface with the E-UTRAN 111 over a S1-U interface defined by 3GPP. The S-GW 140 may further provide mobility anchor for inter-eNB and inter-3GPP access mobility. The P-GW 150 is a bearer plane element that may interface with packet data networks (PDN) 170 over a SGi interface defined by 3GPP. The P-GW 150 may perform functions such as IP address allocation to a UE, policy enforcement, packet filtering and charging for sessions. The S-GW 140 may interface with the P-GW 150 over a S5 interface defined by 3GPP if the P-GW 150 is in a visited public land mobile network (VPLMN). Alternatively, the S-GW 140 may interface with the P-GW 150 over a S8 interface defined by 3GPP if the P-GW 150 is in a home PLMN (HPLMN). Therefore, the interface between the S-GW 140 and the P-GW 150 is depicted as S5/S8 in FIG. 1. According to some examples of the present invention, the S-GW 140 may send create session requests to the P-GW 150 over control plane at the reference point S5/S8.

The P-GW 150 may interface with a policy and charging rules function (PCRF) 160 over the reference point Gx defined by 3GPP. The PCRF 160 may perform functions such as gating and QoS policy control and flow based charging control. The PCRF 160 may provide policy and charging rules to the P-GW 150 over the Gx reference point. Further, the P-GW 150, according to examples of the present invention, may provide a charging identity to the PCRF 160 over the Gx reference point. The PCRF 160 may interface with an application function (AF) in a PDN 170 over the reference point Rx defined by 3GPP.

The network may also include a home subscriber server (HSS) 130 that may contain data related to subscribers. The reference point S6a between the MME 121 and the HSS 130 may provide a diameter interface for transfer of subscription and authentication data for authenticating/authorizing user access to the EPS.

The EPC network may be used in conjunction with other access networks, e.g., GERAN 113 and UTRAN 112. For example, a user equipment 103 may connect to a GERAN network 113 over a Um interface defined by 3GPP. Similarly, a user equipment 102 may connect to a UTRAN 112 over a Uu interface defined by 3GPP. The GERAN 113 and the UTRAN 112 may connect to a serving GPRS support node (SGSN) 122 over a Gb interface and an Iu interface respectively, as defined by 3GPP. The SGSN 122 may provide similar functions as the MME 121.

In case there is no direct tunnel, the Iu reference point may provide user plane tunneling from UTRAN 112 towards the SGSN 122. The S4 reference point may provide user plane tunneling towards the S-GW 140. In case of a direct tunnel, the reference point S12 provides user plane tunneling from UTRAN 112 towards the S-GW 140. The reference point S6d defined by 3GPP between the SGSN 122 and the HSS 130 may provide a diameter interface for transfer of subscription and authentication data for authenticating/authorizing user access to the EPS. The reference point S3 defined by 3GPP may provide for mobility between UTRAN and E-UTRAN. The SGSN 122 may interface with other SGSNs over the S16 reference point defined by 3GPP.

Figure 2:
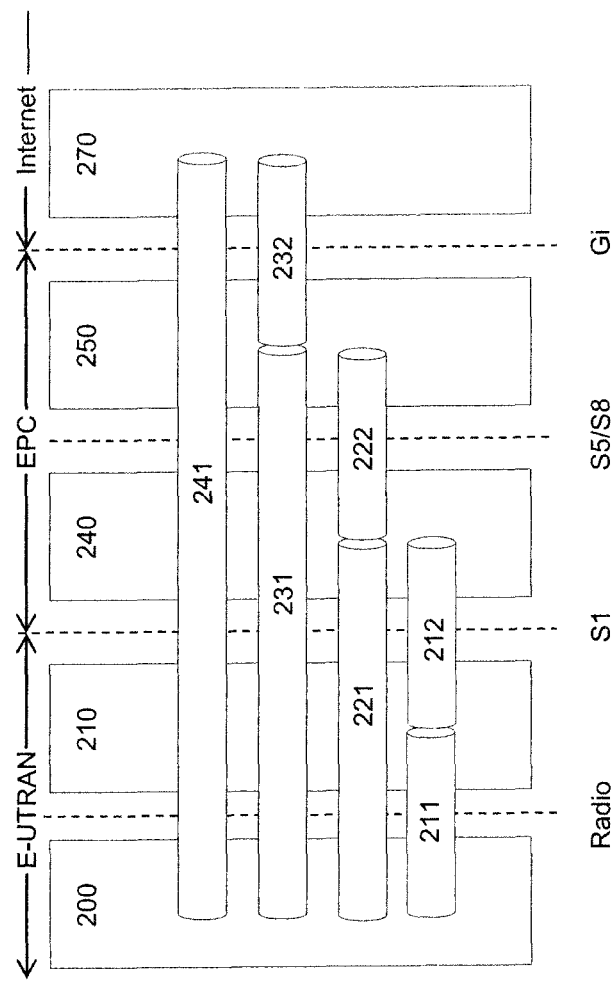
FIGS. 2 and 2a show architectures for user data transmission in an evolved packet system (EPS) and in a UMTS system respectively.

FIG. 2 illustrates the bearer architecture for providing end-to-end service for a user equipment 200. In an EPS, end-to-end service may be provided by an EPS bearer 231. An EPS bearer identity may be allocated by an MME to uniquely identify an EPS bearer 231. The EPS bearer 231 may comprise 3 bearers, a radio bearer 211, a S1 bearer 212 and a S5/S8 bearer 222. A radio bearer 211 may transport packets across a radio interface (e.g., LTE-Uu) between the UE 200 and an E-UTRAN 210. An S1 bearer 212 may transport packets across S1 interface between the E-UTRAN 210 and an S-GW 240. An S5/S8 bearer 222 may transport packets across S5/S8 interface between the S-GW 240 and a P-GW 250. A concatenation of the radio bearer 211 and the S1 bearer 212, referred to as E-RAB (E-UTRAN radio access bearer) 221, may transport packets between the E-UTRAN 210 and EPC. The EPS bearer 231 may be considered a concatenation of the E-RAB 221 and an S5/S8 bearer. The EPS bearer 231 and an external bearer 232 (across Gi interface between the P-GW 250 and a peer entity 270) may provide an end-to-end service bearer 241.

An EPS bearer 231 may uniquely identify traffic flows that receive common QoS treatment between the UE 200 and the P-GW 250. The EPS bearer traffic flow template (TFT) is defined as a set of all packet filters associated with that EPS bearer. An EPS bearer that may be established when the UE 200 connects to a PDN and that may remain established throughout the lifetime of the PDN connection to provide the UE 200 with always-on IP connectivity to that PDN is referred to as the default bearer. Any additional EPS bearer that may be established for the same PDN connection is referred to as a dedicated bearer.

An EPS bearer QoS profile may include the following:
QoS class identifier (QCI)—a scalar that may be used as a reference to access node-specific parameters that control bearer level packet forwarding treatment.
Allocation and Retention Priority (ARP)—may contain information about priority level (scalar), pre-emption capability (flag) and pre-emption vulnerability (flag). The ARP may be used to decide whether a bearer establishment/modification request can be accepted or needs to be rejected due to resource limitations.
Guaranteed Bit Rate (GBR)—may denote the bit rate that can be expected to be provided by a GBR bearer, i.e., an EPS bearer with a GBR requirement included in its QoS profile.
Maximum Bit Rate (MBR)—may limit the bit rate that may be expected to be provided by a GBR bearer.
In addition to the above, the following QoS parameters may be applied to an aggregated set of EPS bearers:
Access Point Name (APN) Aggregate Maximum Bit Rate (APN-AMBR)—may limit the aggregate bit rate that can be expected to be provided across all non-GBR bearers and across all PDN connections of an APN.
User Equipment (UE)-AMBR—may limit the aggregate bit rate that can be expected to be provided across all non-GBR bearers of a UE.

Figure 2A:
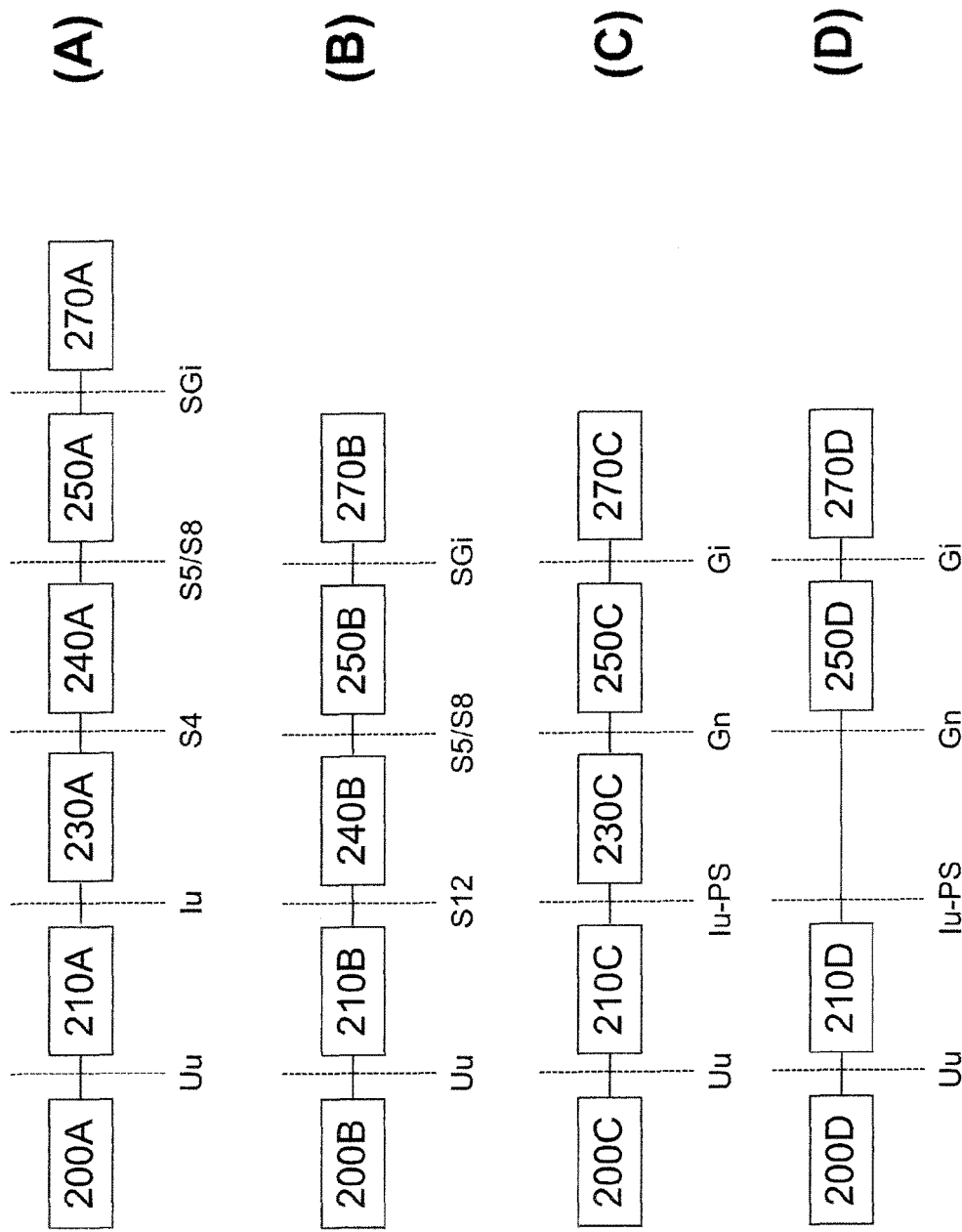

FIG. 2a shows architectures for user data transmission in UMTS systems. Bearers for transmission of user data may be established across the various interfaces. For example, as shown in (A):
a bearer may be established across a Uu interface between a user equipment 200A and UTRAN 210A;
a bearer may be established across a Iu interface between the UTRAN 210A and a serving GPRS support node (SGSN) 230A;
a bearer may be established across a S4 interface between the SGSN 230A and a serving GW (S-GW) 240A;
a bearer may be established across a S5/S8 interface between the S-GW 240A and a PDN gateway (P-GW) 250A; and
a bearer may be established across a SGi interface between the P-GW 250A and internet 270A.
Similarly, as shown in (B):
a bearer may be established across a Uu interface between a user equipment 200B and UTRAN 210B;
a bearer, a direct tunnel, may be established across a S12 interface between the UTRAN 210B and a serving GW (S-GW) 240B;
a bearer may be established across a S5/S8 interface between the S-GW 240B and a PDN gateway (P-GW) 250B; and
a bearer may be established across a SGi interface between the P-GW 250B and internet 270B.
In (C) is shown a possibility, wherein:
a bearer may be established across a Uu interface between a user equipment 200C and UTRAN 210C;
a bearer may be established across a Iu-PS interface between the UTRAN 210C and a $3^{rd}$ generation serving GPRS support node (3G-SGSN) 230C;
a bearer may be established across a Gn interface between the SGSN 230C and a $3^{rd}$ generation gateway GPRS support node (3G-GGSN) 250C; and
a bearer may be established across a Gi interface between the 3G-GGSN 250C and internet 270C.
In (D) is shown a possibility, wherein:
a bearer may be established across a Uu interface between a user equipment 200D and UTRAN 210D;
a bearer may be established across a Iu-PS and Gn interfaces between the UTRAN 210D and a $3^{rd}$ generation gateway GPRS support node (GGSN) 250D; and
a bearer may be established across a Gi interface between the 3G-GGSN 250D and internet 270D.

Figure 3:
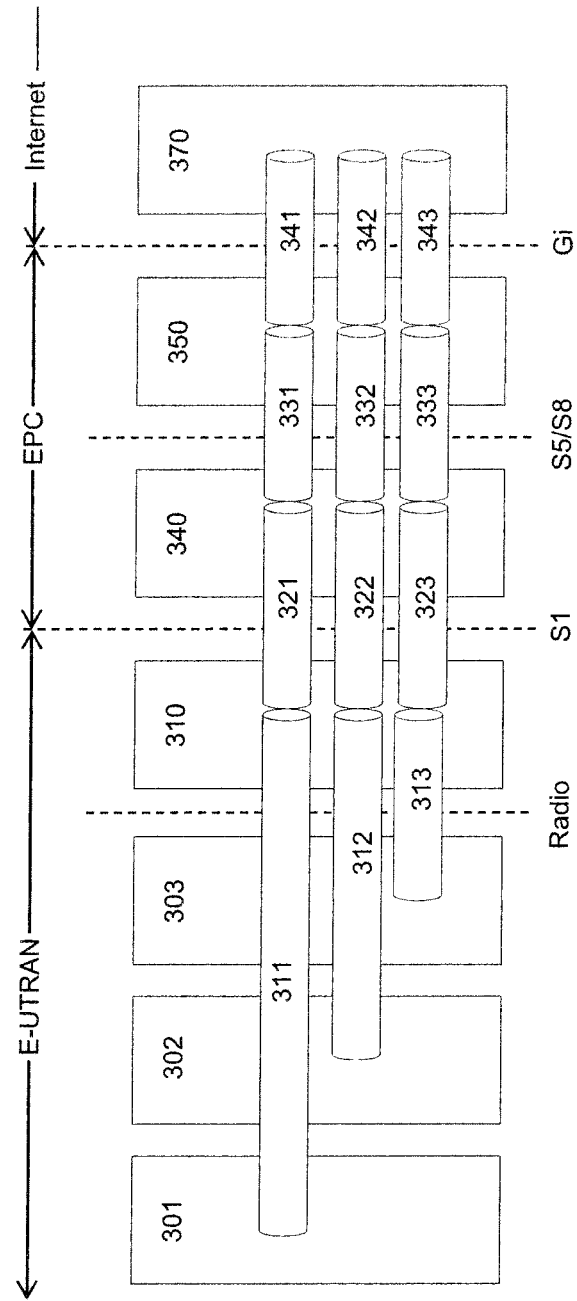
FIG. 3 shows a bearer architecture wherein individual bearers are set up for each device separately.

FIG. 3 shows a bearer architecture that may be used for transmission of user data for a plurality of devices. In the figure are shown user equipments 301, 302 and 303 that may transmit and/or receive user data. For each of these devices, a separate set of bearers may be set up as shown in an exemplary architecture in FIG. 3. For example, the user data (both uplink and downlink) of a user equipment 301 may be transmitted using a concatenation of a radio bearer 311 between the user equipment 301 and an eNB 310, an S1 bearer 321 between the eNB 310 and an S-GW 340, an S5/S8 bearer 331 between the S-GW 340 and a P-GW 350 and an external bearer 341 between the P-GW 350 and a peer entity 370. Similarly, the user data (both uplink and downlink) of user equipment 302 may be transmitted using a concatenation of a radio bearer 312 between the user equipment 302 and the eNB 310, an S1 bearer 322 between the eNB 310 and the S-GW 340, an S5/S8 bearer 332 between the S-GW 340 and the P-GW 350 and an external bearer 342 between the P-GW 350 and the peer entity 370. In a similar way, the user data (both uplink and downlink) of the user equipment 303 may be transmitted using a concatenation of a radio bearer 313 between the user equipment 303 and the eNB 310, an S1 bearer 323 between the eNB 310 and the S-GW 340, an S5/S8 bearer 333 between the S-GW 340 and the P-GW 350 and an external bearer 343 between the P-GW 350 and the peer entity 370.

In case of machine type communication devices (MTC devices), e.g., smart meters, that may use similar applications and may have similar QoS, user data may be transmitted by these devices e.g., once a day to a server but almost simultaneously. Since the number of such devices may be huge, this will necessitate establishment of huge number of end-to-end bearers, each of which may comprise a radio bearer, an S1 bearer, an S5/S8 bearer and an external bearer. Establishing such end-to-end bearer for each device may require an enormous amount of network resources and signaling. Similar problems may arise when several devices attached to a network need to be detached at the same time. Also, performing policy/QoS control and charging individually for each device and each session at a P-GW, which may also act as the policy and charging enforcement function (PCEF), leads to a huge load at the P-GW and at a policy control element such as e.g., a Policy and charging rules function (PCRF), which may be present in the network.

Systems comprising bearers for transmitting user traffic of a group of devices according to some examples of the present invention, shown in FIGS. 4-8, attempt to overcome the drawbacks outlined above. In these examples, at least one of S1, S5/S8 and external bearers may be established in a such way as to transmit (uplink and downlink) user data of a group of devices. Such group of devices may be defined by a network operator or it may be based on agreements between a service provider, e.g., utility service provider owning the group of devices, and the network operator. It may be defined at the time of subscription and the group of devices may be identified by a group identity (group ID).

The group of devices may be subscribed for same or similar applications with almost identical QoS and traffic characteristics, e.g., amount of user data exchanged, data sent only at certain times a day/week/month etc. Additionally, a group of devices may be defined based on the location of devices, e.g., machine type communication devices that may be stationary. Such a group definition may help optimize mobility management and session management procedures.

The devices that belong to a group may share parts or the whole subscription, thereby reducing permanent storage space in a home subscriber server (HSS) and local storage in core network nodes where subscription information may be downloaded. Such shared subscription may include, for example, information such as QCI, ARP, GBR, MBR, and/or longer periodic routing area update (RAU)/tracking area update (TAU) timers, as defined by 3GPP.

Figure 4:
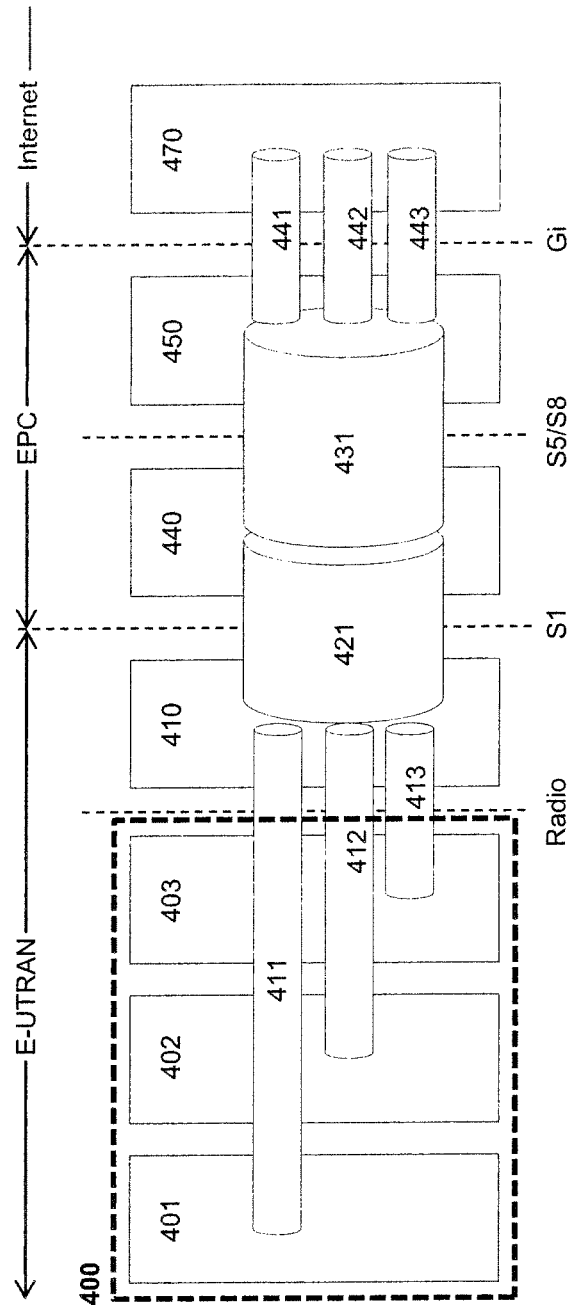
FIG. 4 shows a bearer architecture comprising group S1 and S5/S8 bearers, according to some examples of the present invention.

FIG. 4 shows a bearer architecture, according to a first example of the present invention, for transmission of user data of a group of devices 400 comprising the devices 401, 402 and 403. In this example, an S1 bearer 421 and an S5/S8 bearer 431 may transmit user data (uplink and downlink) of the group of devices 400. The bearers 421 and 431 may be termed as group bearers, since they transmit user data of a group of devices 400. The devices 401, 402 and 403 may transmit user data to an eNB 410 over the radio bearers 411, 412 and 413 respectively. Similarly, a P-GW 450 may transmit user data of devices 401, 402 and 403 over external bearers 441, 442 and 443 respectively to a peer entity 470. The radio bearers 411, 412 and 413 as well as external bearers 441, 442 and 443 may be termed as individual bearers since they transmit user data for individual devices 401, 402 and 403. The eNB 410 may map the individual radio bearers 411, 412, 413 to the group S1 bearer 421. An S-GW 440 may map the group S1 bearer 421 to the group S5/S8 bearer 431. The P-GW 450 may map the individual external bearers 441, 442 and 443 to the group S5/S8 bearer 431.

Figure 5:
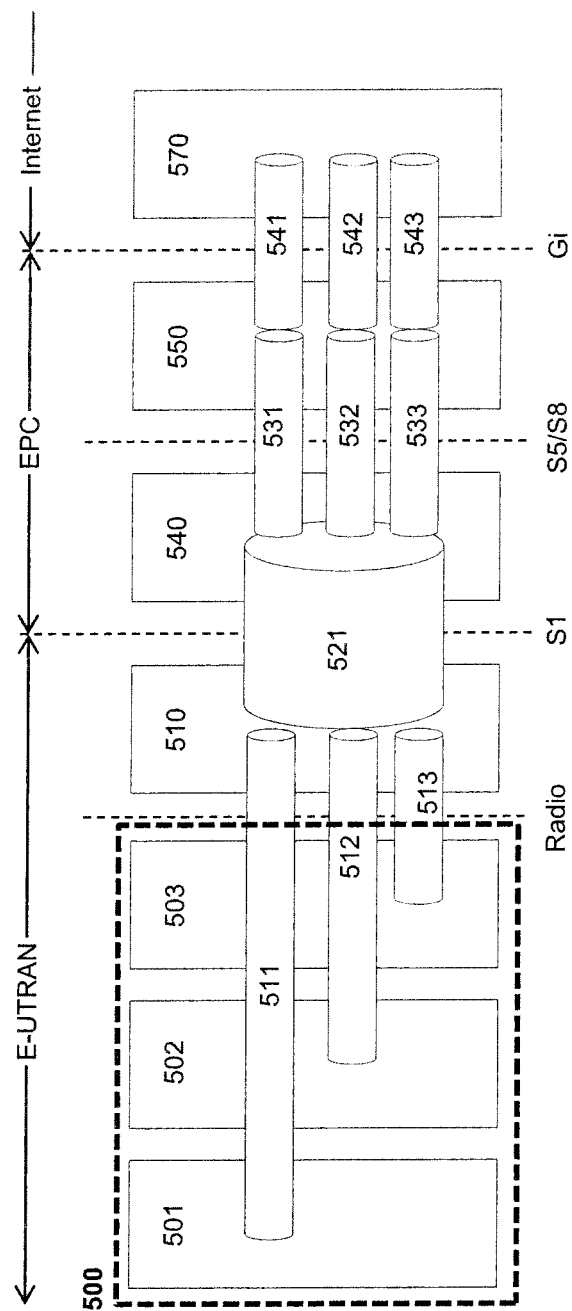
FIG. 5 shows a bearer architecture comprising a group S1 bearer, according to some examples of the present invention.

FIG. 5 shows a bearer architecture, according to a second example of the present invention, for transmission of user data of a group of devices 500 comprising the devices 501, 502 and 503. In this example, an S1 group bearer 521 may transmit user data (uplink and downlink) of the group of devices 500. The individual radio bearers 511, 512 and 513, the individual S5/S8 bearers 531, 532 and 533 and the individual external bearers 541, 542 and 543 respectively may transmit user traffic of devices 501, 502 and 503. An eNB 510 may map the individual radio bearers 511, 512, 513 to the group S1 bearer 521. An S-GW 540 may map the individual S5/S8 bearers 531, 532, 533 to the group S1 bearer 521. A P-GW 550 may map the individual external bearers 541, 542 and 543 to the individual S5/S8 bearers 531, 532 and 533 respectively.

Figure 6:
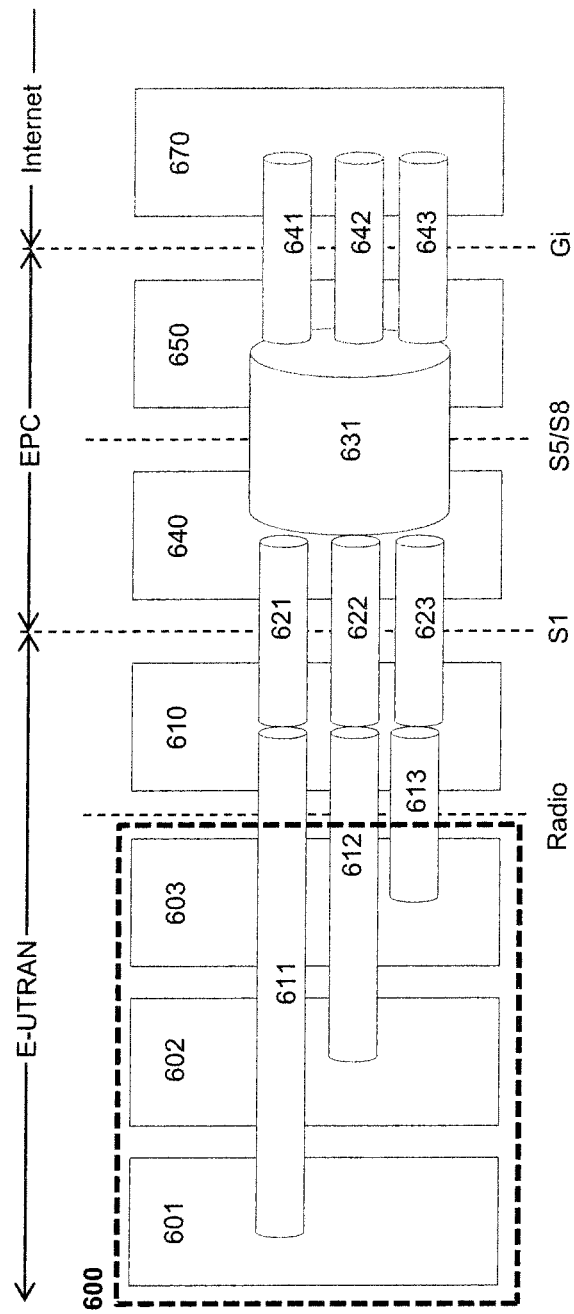
FIG. 6 shows a bearer architecture comprising a group S5/S8 bearer, according to some examples of the present invention.

FIG. 6 shows a bearer architecture, according to a third example of the present invention, for transmission of user data of a group of devices 600 comprising the devices 601, 602 and 603. In this example, an S5/S8 group bearer 631 may transmit user data (uplink and downlink) of the group of devices 600. The individual radio bearers 611, 612 and 613, the individual S1 bearers 621, 622 and 623 and the individual external bearers 641, 642 and 643 respectively may transmit user traffic of devices 601, 602 and 603. An eNB 610 may map the individual radio bearers 611, 612, 613 respectively to the individual S1 bearers 621, 622 and 623. An S-GW 640 may map the group S5/S8 bearers 631 to individual S1 bearers 621, 622 and 623. A P-GW 650 may map the individual external bearers 641, 642 and 643 to the group S5/S8 bearers 631.

Figure 7:
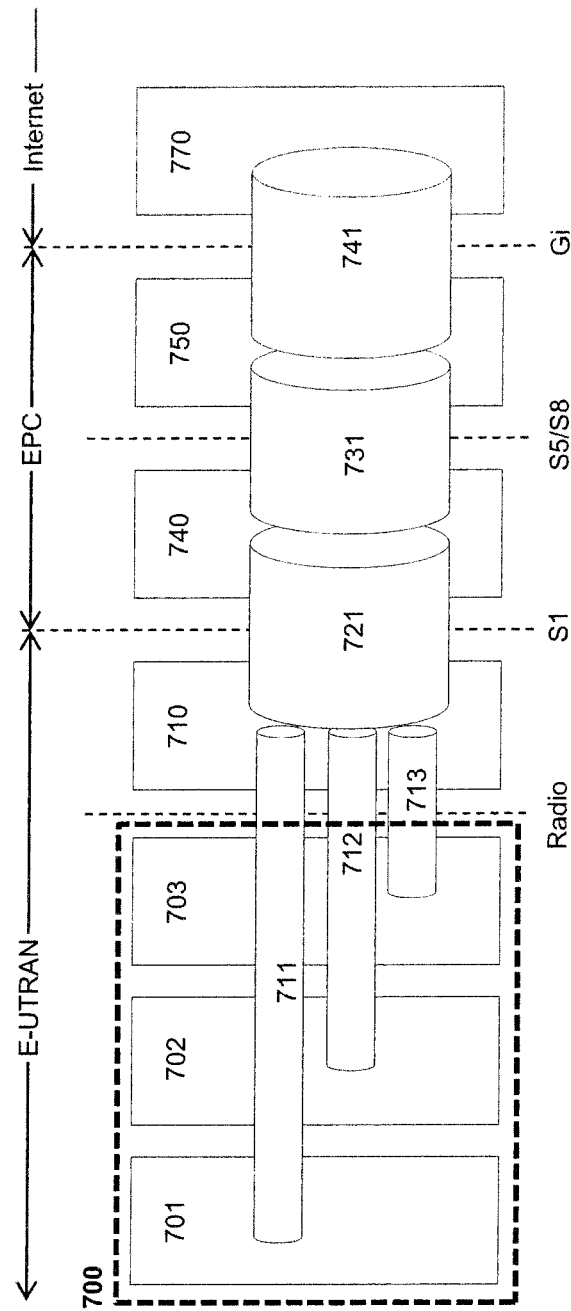
FIG. 7 shows a bearer architecture comprising group S1, S5/S8 and external bearers, according to some examples of the present invention.

FIG. 7 shows a bearer architecture, according to a fourth example of the present invention, for transmission of user data of a group of devices 700 comprising the devices 701, 702 and 703. In this example, group bearers for transmitting user data of the group of devices 700 are established across the S1, S5/S8 and Gi interfaces. An eNB 710 may map the individual radio bearers 711, 712, 713 to the group S1 bearer 721. An S-GW 740 may map the group S1 bearer 721 to the group S5/S8 bearer 731. A P-GW 750 may map the group S5/S8 bearer 731 to the group external bearer 741.

Figure 8:
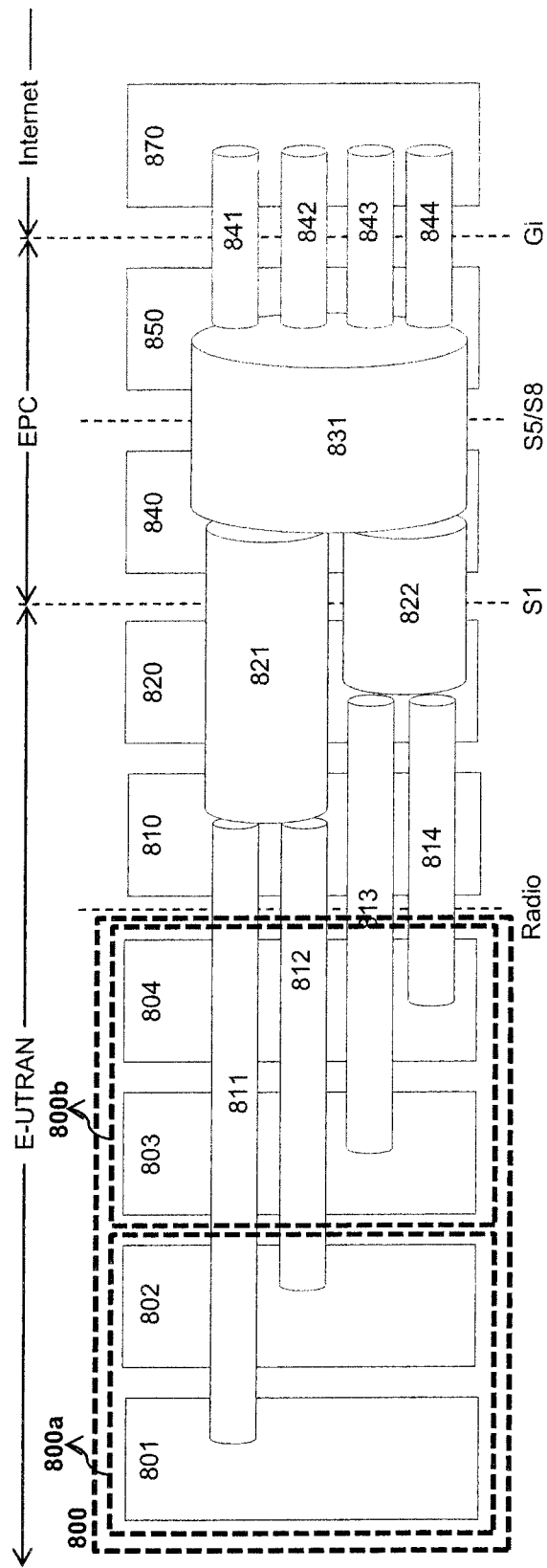
FIG. 8 shows a bearer architecture comprising group S1 bearers and a group S5/S8 bearer, according to some examples of the present invention.

FIG. 8 shows a bearer architecture, according to a fifth example of the present invention, for transmission of user data of a group of devices 800 comprising the devices 801, 802, 803 and 804. In this example, a sub-group of devices 800a comprising the devices 801 and 802 may be connected to an eNB 810, while another sub-group of devices 800b comprising the devices 803 and 804 may be connected to an eNB 820.

Accordingly, two group bearers 821 and 822 may be established across S1 interface for transmitting user data of the sub-groups of devices 800a and 800b respectively. A group bearer 831 may be established across an S5/S8 interface for transmitting user data of the group of devices 800 comprising the devices 801, 802, 803 and 804. Individual external bearers 841, 842, 843 and 844 respectively may be established for transmission of user traffic of device 801, 802, 503 and 804. The eNB 810 may map the individual radio bearers 811 and 812 to the group S1 bearer 821. Similarly, the eNB 820 may map the individual radio bearers 813 and 814 to the group S1 bearer 822. An S-GW 840 may map the group S1 bearers 821 and 822 to the group S5/S8 bearer 831. A P-GW 850 may map the group S5/S8 bearer 831 to individual external bearers 841, 842, 843 and 844.

In the examples above, the eNB's 410, 510, 610, 710, 810 and 820, the S-GW's 440, 540, 640, 740 and 840 and/or the P-GW's 450, 550, 650, 750 and 850 may assign a group tunnel end point identifier (TEID) for the group bearers. In addition, they may assign individual TEIDs so that user traffic intended for individual devices may be routed to the correct device.

Figure 9A:
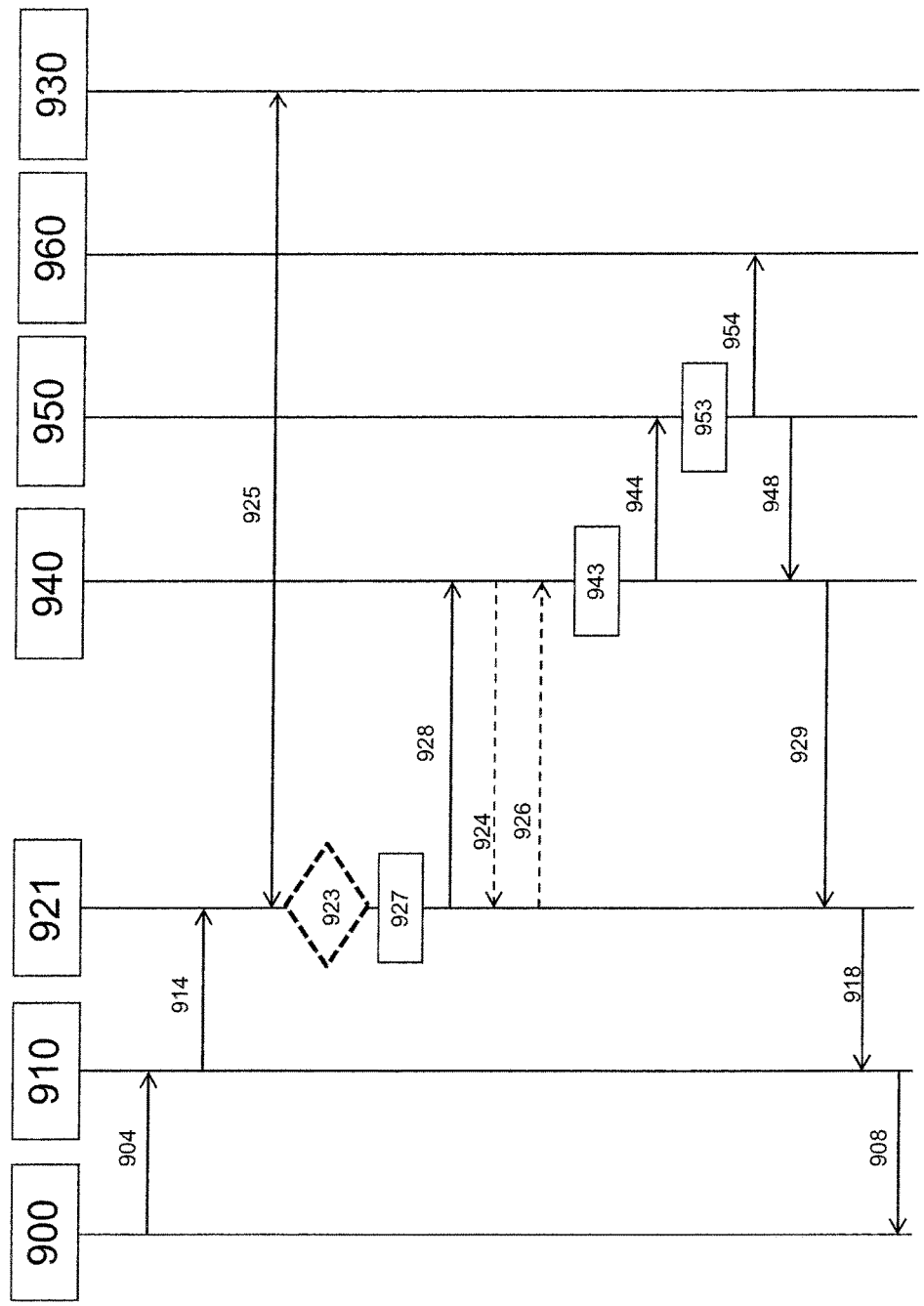
FIGS. 9a, b, and c show procedures, according to some examples of the present invention, for establishment of group and/or individual bearers.

The procedures for establishment of the bearer architectures, as illustrated by but not limited to, the above examples are described hereinafter, with reference to FIGS. 9a, b and c. FIGS. 9a, b and c illustrate some examples of allocation of a bearer identity by a mobility management entity (MME) 921. A user equipment (UE) 900 may, in order to establish a connection with a packet data network (PDN), send an attach request 904 to an eNB. Such attach request may comprise an identity of the UE 900 (e.g., international mobile subscriber identity (IMSI), international mobile equipment identity (IMEI), global unique temporary identity (GUTI)). The attach request may be forwarded 914 by the eNB 910 to a mobility management entity (MME) 921.

The MME 921 may, upon receipt of the attach request 914, initiate an authentication procedure 925 for the UE 900 with a home subscriber server (HSS) 930. During the authentication procedure, the MME 921 may verify if the UE belongs to a group of devices and if so, request an identity of the group of devices. Alternatively, the MME 921 may verify if the attach request is received from a master device responsible for communicating for attaching or detaching a group of devices. In either case, the MME 921 may obtain an identity of the group of devices if the result of the verification is true.

The MME 921 may further verify if the UE 900 belongs to a sub-group of devices (e.g., 800a or 800b in FIG. 8), that may form part of a group of devices (e.g., 800 in FIG. 8). In such a case, the MME 921 may request and obtain an identity of the sub-group of devices in addition to the identity of the group of devices, during the authentication procedure 925.

After obtaining the identity of the group of devices and optionally identity of a sub-group of devices, the MME 921 may determine 923 if a bearer identity has been previously allocated for the group of devices. If so, the MME 921 allocates 927 this previously allocated bearer identity for the UE 900. Thus, the group of devices may share a common bearer identity.

If it is determined 923 that a bearer identity has not been previously allocated for the group of devices, the MME 921 may allocate 927 a new bearer identity for the group of devices, as illustrated in FIG. 9a. This new bearer identity may be allocated by the MME 921 for all the other devices of the group, when receiving an attach request from the other devices.

Alternatively, if it determined 923 that a bearer identity has not been previously allocated for the group of devices, MME 921 may verify with other network elements such as another MME 922 or an S-GW 940. Such optional procedures are illustrated in FIGS. 9b and c.

Figure 9B:
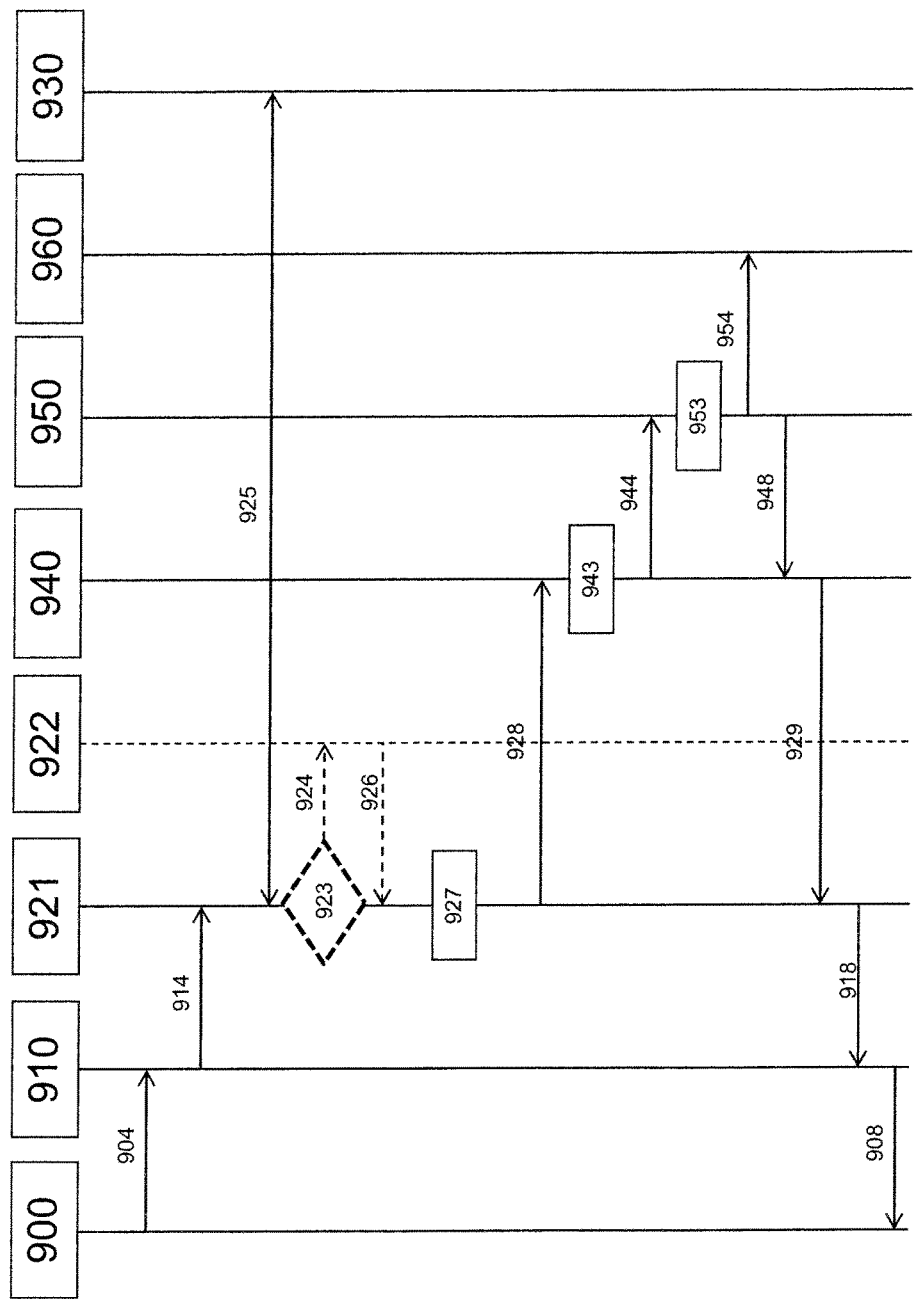

As illustrated in FIG. 9b, if it determined 923 by MME 921 that a bearer identity has not been previously allocated by it (i.e., by MME 921) for the group of devices and if MME 921 is aware of another MME 922 controlling the attach procedures of another sub-group of devices that form part of the group of devices, MME 921 may verify 924 with the other MME 922 if a bearer identity has been previously allocated to the group of devices and if so, obtain 926 the bearer identity. Subsequently, MME 921 may allocate 927 the previously allocated bearer identity.

Figure 9C:
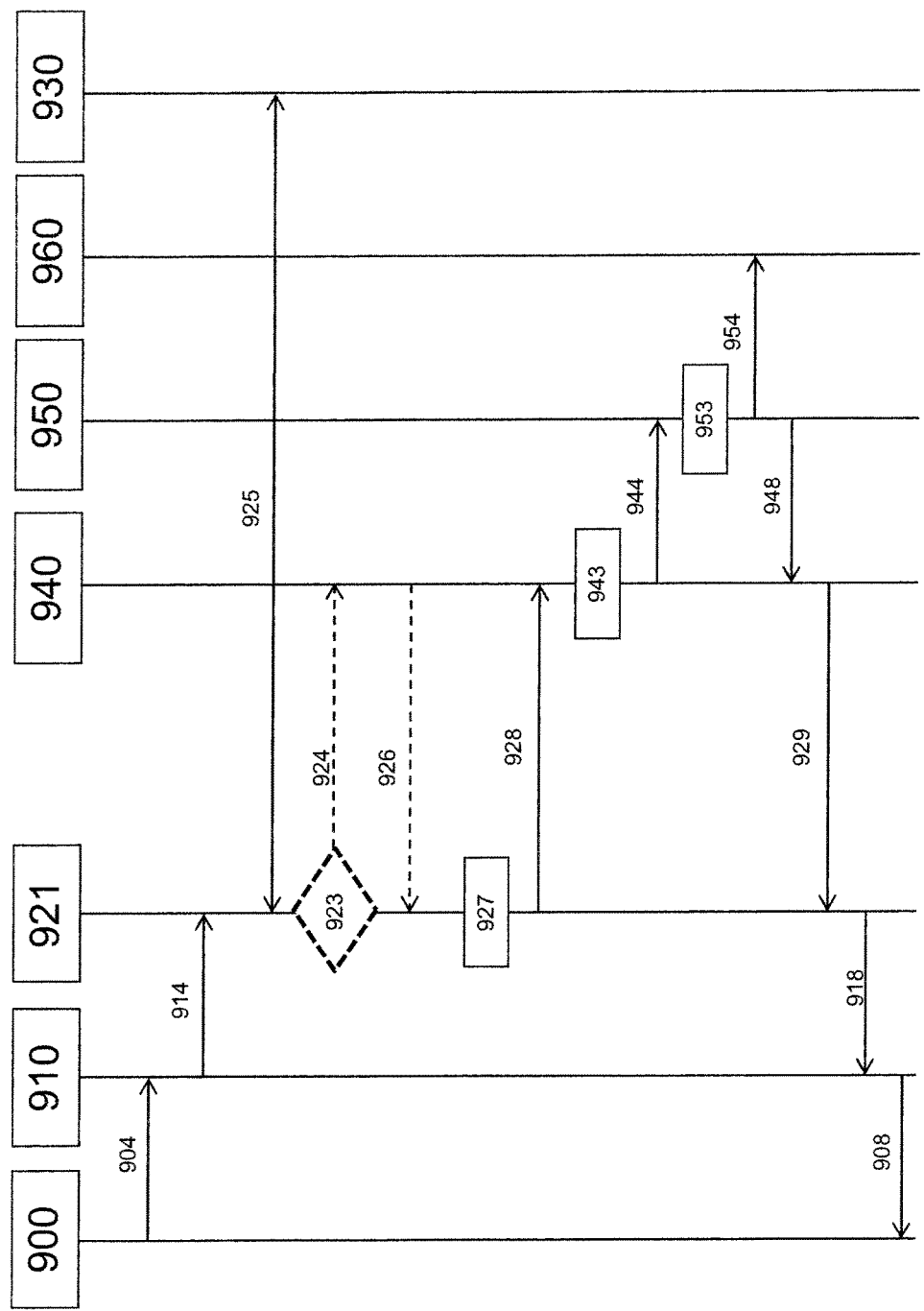

FIG. 9c illustrates another optional procedure, in case it is determined 923 by MME 921 that a bearer identity has not been allocated for the group of devices, wherein MME 921 may verify 924 with an S-GW 940 if a bearer identity exists for the group of devices. It may be noted that such bearer identity might have been allocated by another MME (such as 922 in FIG. 9a), but MME 921 may not be aware of this or MME 921 may not be aware of the address of such MME 922 (FIG. 9a). MME 921 may receive a response 926 from S-GW 940 that may comprise a previously allocated bearer identity if any. Subsequently, MME 921 may allocate 927 the previously allocated bearer identity.

The MME 921 may additionally allocate 927 a bearer identity for the UE 900 alone, which may be used for establishing an individual bearer. If the MME 921 determines that the UE 900 belongs to a sub-group of devices, it may also allocate 927 a bearer identity for the sub-group of devices.

Following the allocation of at least one bearer identity, the MME 921 may select an S-GW 940 and a P-GW 950 using the gateway selection functions. After selecting the S-GW 940 and the P-GW 950, the MME 921 may send a create session request 928 to the S-GW 940. The create session request 928 may comprise the identity of the group of devices, the identity of the UE 900 and identity of the sub-group of devices if any. The create session request 928 may further comprise, according to examples of the present invention, any of the allocated bearer identities, i.e., the bearer identity for the group of devices, the bearer identity for the UE 900, and the bearer identity of the sub-group of devices if any. The create session request 928 may also include an MME tunnel endpoint identifier (TEID) for control plane and the selected P-GW address.

The S-GW 940 may check 943, upon receipt of the create session request 928, if a bearer already exists for the group of devices with the allocated bearer identity. If found, the S-GW 940 may update 943 its EPS bearer table with the UE identity. If a bearer does not exist for the group of devices, the S-GW 940 may create 943 a new entry in its EPS bearer table mapping it with any of the identity of the group of devices and the identity of the UE 900. In case of creation of a group bearer, as in example 1 (431 in FIG. 4), example 3 (631 in FIG. 6), example 4 (731 in FIG. 7) and example 5 (831 in FIG. 8), the entry in the bearer table may comprise a bearer identity, an identity of the group of devices and an identity of the UE 900. In case of creation of an individual bearer, as in example (531, 532 or 533 in FIG. 5), the entry in the bearer table may comprise a bearer identity and the identity of an UE 501, 502 or 503.

FIG. 9a illustrates optional steps that may be performed by S-GW 940, upon receipt of the create session request 928, if S-GW determines that a different bearer identity has been previously allocated to the group of devices. The S-GW 940 in such a case may send a message 924 comprising the previously allocated bearer identity. Such a message 924 may be a create session response or any notification message. The MME 921 may, in turn, send an acknowledgement message 926. The acknowledgement message 926 may also be a updated create session request.

Subsequent to the creation 943 of a bearer, the S-GW 940 may send a create session request 944 to the P-GW 950, based on the P-GW address received in the create session request 924 from the MME 921. The create session request 944 may comprise the identity of the group of devices, the identity of the UE 900 and the identity of a sub-group of devices if any. The create session request 944 may further comprise, according to examples of the present invention, any of the allocated bearer identities (allocated by the MME 921) comprising the bearer identity for the group of devices, the bearer identity for the UE and the bearer identity of the sub-group of devices if any. The create session request 944 may also include an S-GW TEID for the group bearer as well as a unique TEID individual bearers.

It may be noted that the create session request 944 may alternatively comprise any previously allocated bearer identity for the group of devices that may be different from the one allocated by the MME 921.

If dynamic policy and charging control (PCC) is deployed, the P-GW 950 may perform an IP-CAN session establishment procedure with a policy and charging control rules function (PCRF) 960 and thereby obtain default PCC rules for the group. If dynamic PCC rules are not deployed, the P-GW 950 may apply local QoS policy for the group.

The P-GW 950 may check 953, upon receipt of the create session request 944, if an external bearer already exists for the group of devices. If found, the P-GW may update 953 the bearer context with the UE identity. If an external bearer does not exist for the group of devices, the P-GW 950 may create 953 a new bearer context mapping it with any of the identity of the group of devices and the UE identity. In case of creation of a group external bearer, as in examples 4 (741 in FIG. 7), the bearer context may comprise a bearer identity, an identity of the group of devices and a UE identity. In case of creation of an individual bearer, as in example 1 (441, 442 or 443 in FIG. 4), example 2 (541, 542 or 543 in FIG. 5), example 3 (641, 642 or 643 in FIG. 6), example 5 (841, 842, 843 or 844 in FIG. 8), the bearer context may comprise a bearer identity and the identity of the UE.

The P-GW 950 may store a mapping of the external bearers and the S-GW TEID for user plane to route the downlink user data to the UEs.

Further, according to examples of the present invention, the P-GW 950 may check if a charging identity already exists for the group of devices. If so, the P-GW 950 may allocate 954 the same charging identity for the UE 900. If not, the P-GW 950 may allocate 954 a new charging identity for the UE 950, which identity may be used for all the devices of the group.

The P-GW 950 may generate a P-GW TEID for group bearers and for individual bearers and include them in a create session response 948 sent to the S-GW 940. The S-GW 940 may send a create session response 929 to the MME 921 that may include a group S-GW TEID for the S1-U user plane (to be used by e-NB 910) and an S-GW TEID for the control plane (to be used by the MME 921). Optionally, the create session response 929 may comprise any bearer identity previously allocated for the group of devices that may be different from the one allocated by the MME 921. This may serve as a notification to the MME 921. The MME 921 may, in turn, update the allocation of bearer identity for the group of devices.

The MME 921 may then send an attach accept message 918 to eNB 910. The attach accept message 918 may include, according to examples of the present invention, any of the bearer identities allocated 927 by the MME 921, the S-GW TEID for S1-U user plane and the S-GW address for user plane.

The eNB 910 may send a radio resource control (RRC) connection reconfiguration message 908 that may include an attach accept message to the UE 900. The message 908 may include a radio bearer identity. In addition, the eNB 910 may assign an eNB TEID for the user plane and send the information to the MME 921 along with the address of the eNB for the downlink traffic on the S1-U reference point. The MME 921 may forward the information to the S-GW 940.

The above-described procedures may be used for establishment of group and/or individual bearers for transmitting user data of a group of devices. According to one embodiment of the present invention, the MME 921 may control the establishment of group bearer or individual bearer by sending the required information for establishment of the bearers. For example, if the MME 921 decides that the S-GW 940 should establish a group bearer, the MME 921 may send only identity of the group of devices and bearer identity for the group of devices, whereas if the MME 921 decides that the S-GW 940 should establish an individual bearer for each device, the MME 921 may send only identity of the UE 900 and bearer identity for the UE 900. According to an alternative embodiment of the present invention, the MME 921 may send to the eNB 910, S-GW 940 and/or the P-GW 950, in any of the messages, information comprising an identity of the group and/or sub-group of devices, an identity of the UE 900 and any of the bearer identities comprising a bearer identity for the group and/or sub-group of devices and a bearer identity for the UE 900. The network entities, e.g., the eNB 910, the S-GW 940 and the P-GW 950, may decide to establish a group bearer or individual bearer using the information received in the messages.

The eNB 910 may store a mapping between a radio bearer created using the radio bearer identity and an S1 bearer that may be created using a bearer identity allocated by the MME 921. The S1 bearer may either be a group bearer or an individual bearer, as illustrated in various examples in FIGS. 4-8. Similarly, the S-GW 940 may store a mapping between an S1 bearer and an S5/S8 bearer created using a bearer identity allocated by the MME 921. The S5/S8 bearer may be a group bearer or an individual bearer, as depicted in various examples in FIGS. 4-8. When user data is transmitted for the group of devices using group bearers, TEID(s) for group bearers may be used by the entities such as the eNB 910, the S-GW 940 and the P-GW 950. When user data is transmitted for a specific UE, TEID(s) assigned for individual bearers may be used by these entities.

Figure 10:
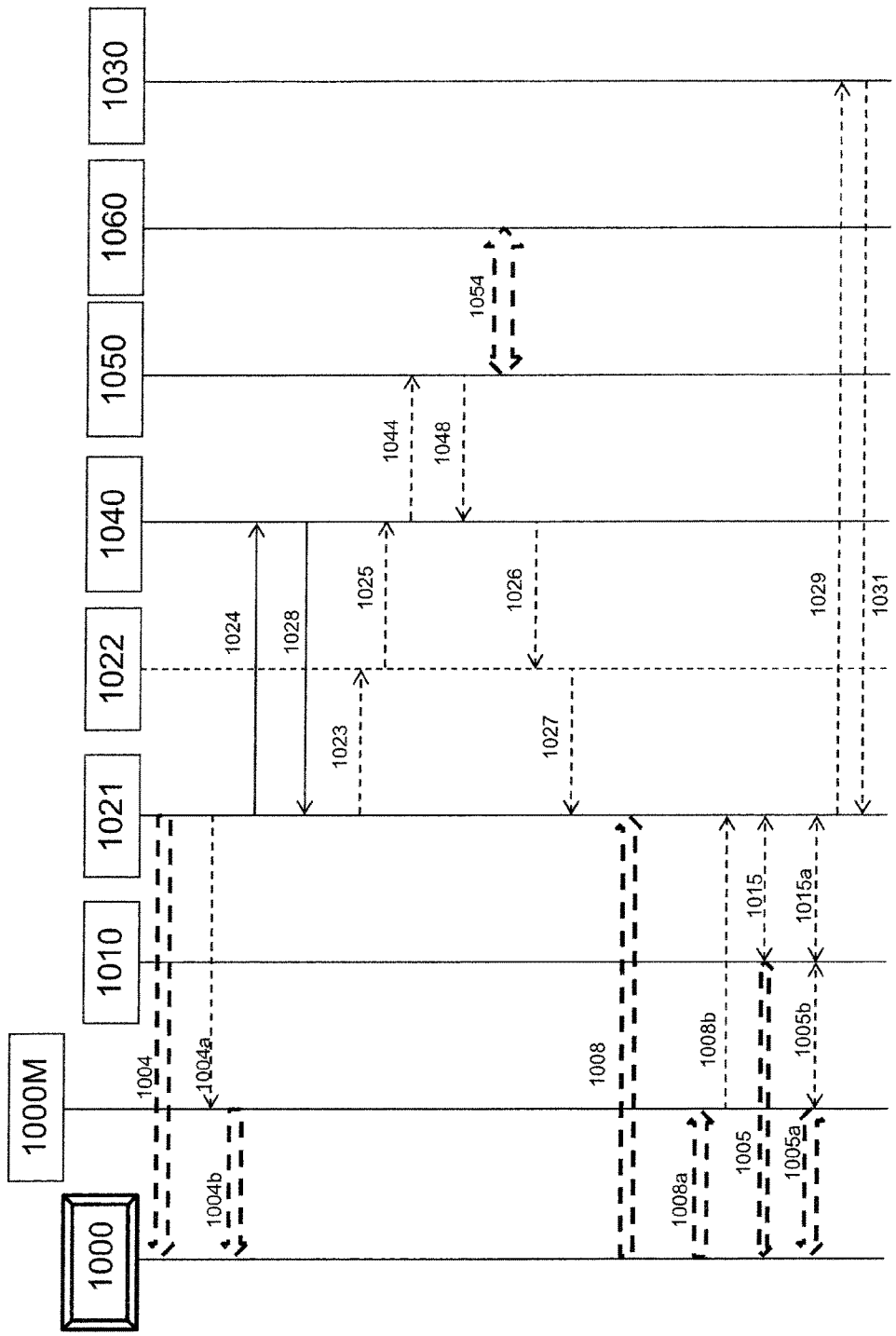
FIG. 10 shows procedures, according to some examples of the present invention, for a mobility management entity initiated deactivation of group and/or individual bearers.

FIGS. 10-13 illustrate procedures, in accordance with examples of the present invention, by which multiple devices belonging to a group of devices may be detached without multiple signaling in the core network. FIG. 10 shows an example of a detach procedure initiated by a mobility management entity (MME) 1021, in accordance with the present invention. The detach procedure may be initiated by the MME 1021 due to reasons such as a network congestion or a determination that a device may not be authorized to be attached to the network. The detach procedure may be initiated by the MME 1021 by sending a detach request 1004 to at least one device 1000 which should be detached. It may be noted that the device(s) 1000 intended to be detached may belong to a group of devices having a group identity. In case of multiple devices to be detached, according to one embodiment of the present invention, independent detach requests 1004 may be sent to each device. Thus, if n devices 1000 are to be detached, n detach requests 1004 may be sent by the MME 1021, one detach request to each of the n devices.

In an alternative embodiment of the present invention, a master device 1000M may be responsible for communicating with the MME 1021. In such a case, a single detach request 1004a may be sent to the master device 1000M, wherein the detach request 1004a provides the identities of the devices to be detached. The master device 1000M in turn may forward the detach request 1004b to the individual devices 1000 to be detached. It may be noted that the master device 1000M may be a device belonging to the group of devices or may be a separate device such as a gateway device. The communication between the master device 1000M and the devices 1000 belonging to the group of devices may be using a radio technology that may be different from GERAN/UTRAN/E-UTRAN technologies.

Subsequently, the MME 1021 may send a delete session request 1024 towards a serving gateway (S-GW) 1040 for the devices to be detached. If multiple devices 1000 need to be detached and individual bearers are set up for the devices, the MME 1021 may send the identities of the bearers for the multiple devices 1000 in the delete session request 1024. If on the other hand, multiple devices 1000 need to be detached and a group bearer exists for the multiple devices, an identity of the group bearer may be sent in the delete session request 1024.

Upon receipt of the delete session request 1024, the S-GW 1040 may determine the bearer(s) that need to be released. If the bearer identities received as part of the delete session request 1024 maps to individual bearers, the S-GW 1040 may release resources and remove the devices to be deactivated from a mapping table comprising a mapping of devices with bearer identities. If the bearer identity received as part of the delete session request 1024 maps to a group bearer and if the delete session request 1024 is for all devices sharing the group bearer, the S-GW 1040 may deactivate the group bearer. On the other hand, if the bearer identity maps to a group bearer and if the delete session request 1024 is only for a sub-group of devices sharing the group bearer, the S-GW 1040 may remove a mapping between the sub-group of devices and the group bearer and retain the group bearer, i.e., the group bearer may not be deactivated. Subsequently, the S-GW 1040 may send a delete session response 1028 to the MME 1021.

If Idle state Signaling Reduction (ISR) is deactivated, the S-GW 1040 may, after releasing the bearers, send a delete session request message 1044 to a P-GW 1050.

If ISR is activated, the MME 1021 may send a detach notification message 1023 to an associated Serving GPRS Support Node (SGSN) 1022. The detach notification 1025 to the SGSN 1022 may include the identities of the devices 1000 that may be detached. The detach notification message may also include a cause indicating whether it is a local or complete detach.

Idle state Signaling Reduction (ISR) is a procedure defined by 3GPP to reduce the frequency of tracking area update and routing area update procedures that may be caused by devices 1000 reselecting between an E-UTRAN and a GERAN/UTRAN which may be operated together.

When ISR is activated, a device 1000 may be registered with both the MME 1021 and the SGSN 1022. Both the SGSN 1022 and the MME 1021 may have a control connection with the S-GW 1040. Also, the MME 1021 and the SGSN 1022 may both be registered at a home subscriber server (HSS) 1030.

If the cause in the detach notification 1023 indicates a complete detach, the SGSN 1022 may send a delete session request message 1025 to the S-GW 1040. If the cause indicates a local detach, the SGSN 1022 may deactivate ISR and the transmission of messages 1025, 1044, 1048, 1054 and 1026 may be skipped.

If ISR is activated, S-GW 1040 may deactivate ISR and may send a Delete Session Request message 1044 to a P-GW 1050. The P-GW 1050 may acknowledge with a delete session response message 1048. The P-GW 1050 may employ an IP-CAN Session Termination procedure 1054, defined by 3GPP with a policy and charging rules function (PCRF) 1060 to indicate that the bearers are released.

The S-GW 1040 may acknowledge with a delete session response message 1026 to the SGSN 1022. The SGSN 1022 may send a detach acknowledge message 1027 to the MME 1021.

The devices 1000 to be detached may send detach accept message 1008 to the MME 1021. If there are multiple devices to detached, each of the device may send a detach accept message 1008 to the MME 1021. Alternatively, if a master device 1000M is present, the master device 1000M may send a single detach accept message 1008b towards the MME 1021. The master device 1000M may receive detach messages 1008a from the devices to be detached.

Signaling connections may then be released, 1015, between an eNB 1010 and the MME 1021. Similarly, signaling connections may be released, 1005, between the devices 1000 and the eNB 1010. If multiple devices are detached, signaling connections between each device and the eNB 1010 may be released. If a master device 1000M is present, signaling connections may be released, 1005a, between the master device 1000M and the devices 1000, then signaling connections may be released, 1005b, between the master device 1000M and the eNB 1010. The eNB 1010 may release, 1015a, signaling connections with the MME 1021.

After the MME 1021 receives a delete session response 1028 from the S-GW 1040, if a subscription data indicates that the devices 1000 are allowed to perform handover to non-3GPP access, the MME 1021 may send a Notify Request 1029 to indicate that the HSS 1030 may remove the access point name (APN) and P-GW identity pairs for the devices 1000. The HSS 1030 may remove all APN and P-GW identity pairs that may be dynamically stored and may send a Notify Response 1031 to the MME 1021.

Figure 11:
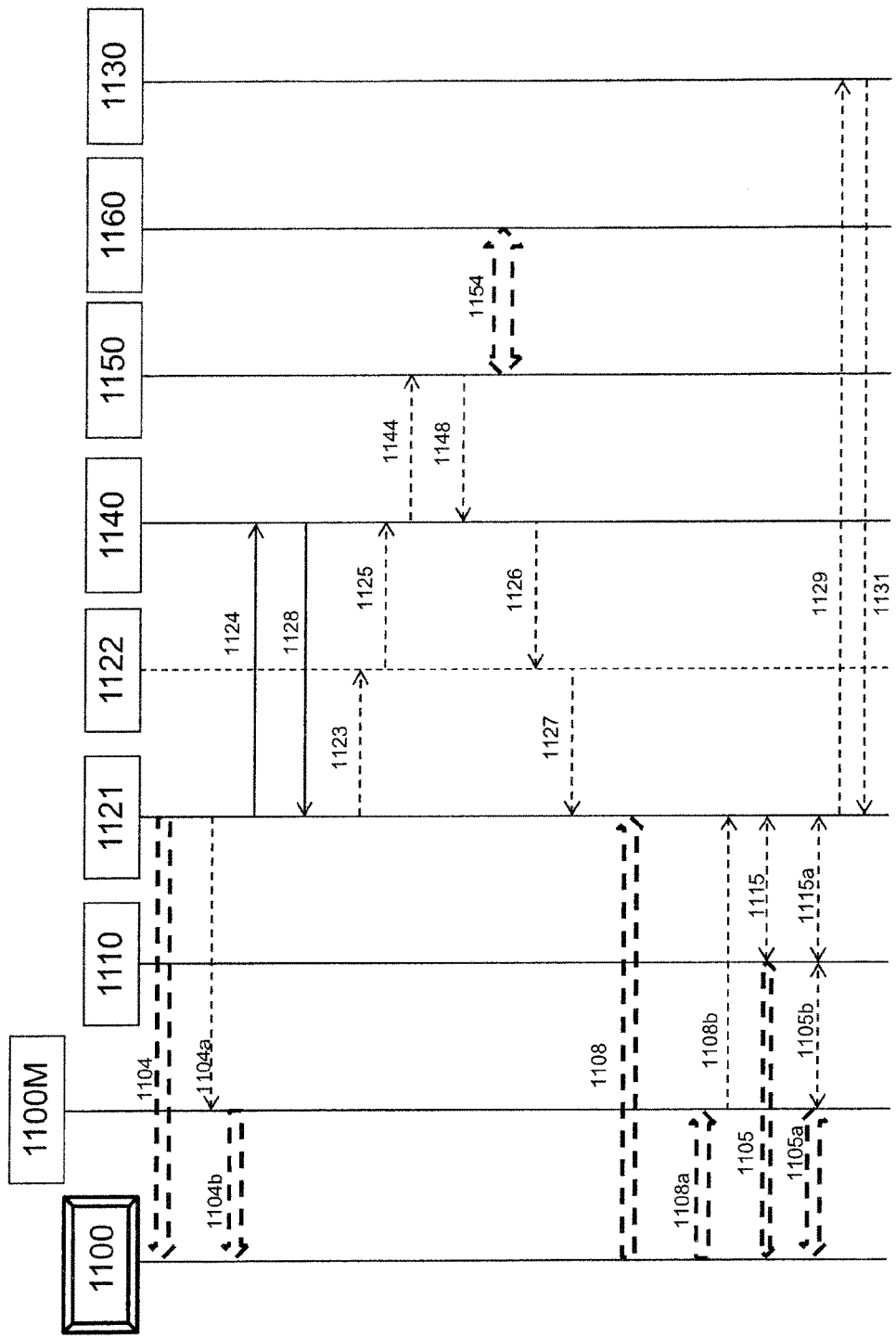
FIG. 11 shows procedures, according to some examples of the present invention, for a serving GPRS support node initiated deactivation of group and/or individual bearers.

When ISR is activated, a detach procedure may be initiated by an SGSN, as illustrated in FIG. 11. In this case, The detach procedure may be initiated by the SGSN 1121 due to reasons such as a network congestion or a determination that a device may not be authorized to be attached to the network. The detach procedure may be initiated by the SGSN 1121 by sending a detach request 1104 to at least one device 1100 which should be detached. It may be noted that the device(s) 1100 intended to be detached may belong to a group of devices having a group identity. In case of multiple devices to be detached, according to one embodiment of the present invention, independent detach requests 1104 may be sent to each device. Thus, if n devices 1100 are to be detached, n detach requests 1104 may be sent by the SGSN 1121, one detach request to each of the n devices.

In an alternative embodiment of the present invention, a master device 1100M may be responsible for communicating with an SGSN 1121. In such a case, a single detach request 1104a may be sent to the master device 1100M, wherein the detach request 1104a provides the identities of the devices to be detached. The master device 1100M in turn may forward the detach request 1104b to the individual devices 1100 to be detached. It may be noted that the master device 1100M may be a device belonging to the group of devices or may be a separate device such as a gateway device. The communication between the master device 1100M and the devices 1100 belonging to the group of devices may be using a radio technology that may be different from GERAN/UTRAN/E-UTRAN technologies.

Subsequently, the SGSN 1121 may send a delete session request 1124 towards the S-GW 1140 for the devices to be detached. If multiple devices 1100 need to be detached and individual bearers are set up for the devices, the SGSN 1121 may send the identities of the bearers for the multiple devices 1100 in the delete session request 1124. If on the other hand, multiple devices 1100 need to be detached and a group bearer exists for the multiple devices, an identity of the group bearer may be sent in the delete session request 1124.

Upon receipt of the delete session request 1124, the S-GW 1140 may determine the bearer(s) that need to be released. If the bearer identities received as part of the delete session request 1124 map to individual bearers, the S-GW 1140 may release resources and remove the devices to be deactivated from a mapping table comprising a mapping of devices with bearer identities. If the bearer identity received as part of the delete session request 1124 maps to a group bearer and if the delete session request 1124 is for all devices sharing the group bearer, the S-GW 1140 may deactivate the group bearer. On the other hand, if the bearer identity maps to a group bearer and if the delete session request 1124 is only for a sub-group of devices sharing the group bearer, the S-GW 1140 may remove a mapping between the sub-group of devices and the group bearer and retain the group bearer, i.e., the group bearer may not be deactivated. Subsequently, the S-GW 1140 may send a delete session response 1128 to the SGSN 1121.

Since ISR is activated, the SGSN 1121 may send a detach notification message 1123 to the associated MME 1122. The detach notification 1125 to the MME 1122 may include the identities of the devices 1100 that may be detached.

The MME 1122 may send a delete session request message 1125 to the S-GW 1140. The S-GW 1140 may deactivate ISR and may send a Delete Session Request message 1144 to a P-GW 1150. The P-GW 1150 may acknowledge with a delete session response message 1148. The P-GW 1150 may employ an IP-CAN Session Termination procedure 1154, defined by 3GPP with a policy and charging rules function (PCRF) 1160 to indicate that the bearers are released.

The S-GW 1140 may acknowledge with a delete session response message 1126 to the MME 1122. The MME 1122 may send a detach acknowledge message 1127 to the SGSN 1121.

The devices 1100 to be detached may send detach accept message 1108 to the SGSN 1121. If there are multiple devices to detached, each of the device may send a detach accept message 1108 to the SGSN 1121. Alternatively, if a master device 1100M is present, the master device 1100M may send a single detach accept message 1108b towards the SGSN 1121. The master device 1100M may receive detach messages 1108a from the devices to be detached.

Signaling connections may then be released, 1115, between an eNB 1110 and the SGSN 1121. Similarly, signaling connections may be released, 1105, between the devices 1100 and the eNB 1110. If multiple devices are detached, signaling connections between each device and the eNB may be released. If a master device 1100M is present, signaling connections may be released, 1105a, between the master device 1100M and the devices 1100, then signaling connections may be released, 1105b, between the master device 1100M and the eNB 1110. The eNB 1110 may release, 1115a, signaling connections with the SGSN 1121.

After the SGSN 1121 receives a delete session response 1128 from the S-GW 1140, if a subscription data indicates that the devices 1100 are allowed to perform a handover to a non-3GPP access, the SGSN 1121 may send a Notify Request 1129 to indicate that the HSS 1130 may remove the access point name (APN) and P-GW identity pairs for the devices 1100. The HSS 1130 may remove all APN and P-GW identity pairs that may be dynamically stored and may send a Notify Response 1131 to the SGSN 1121.

Figure 12A:
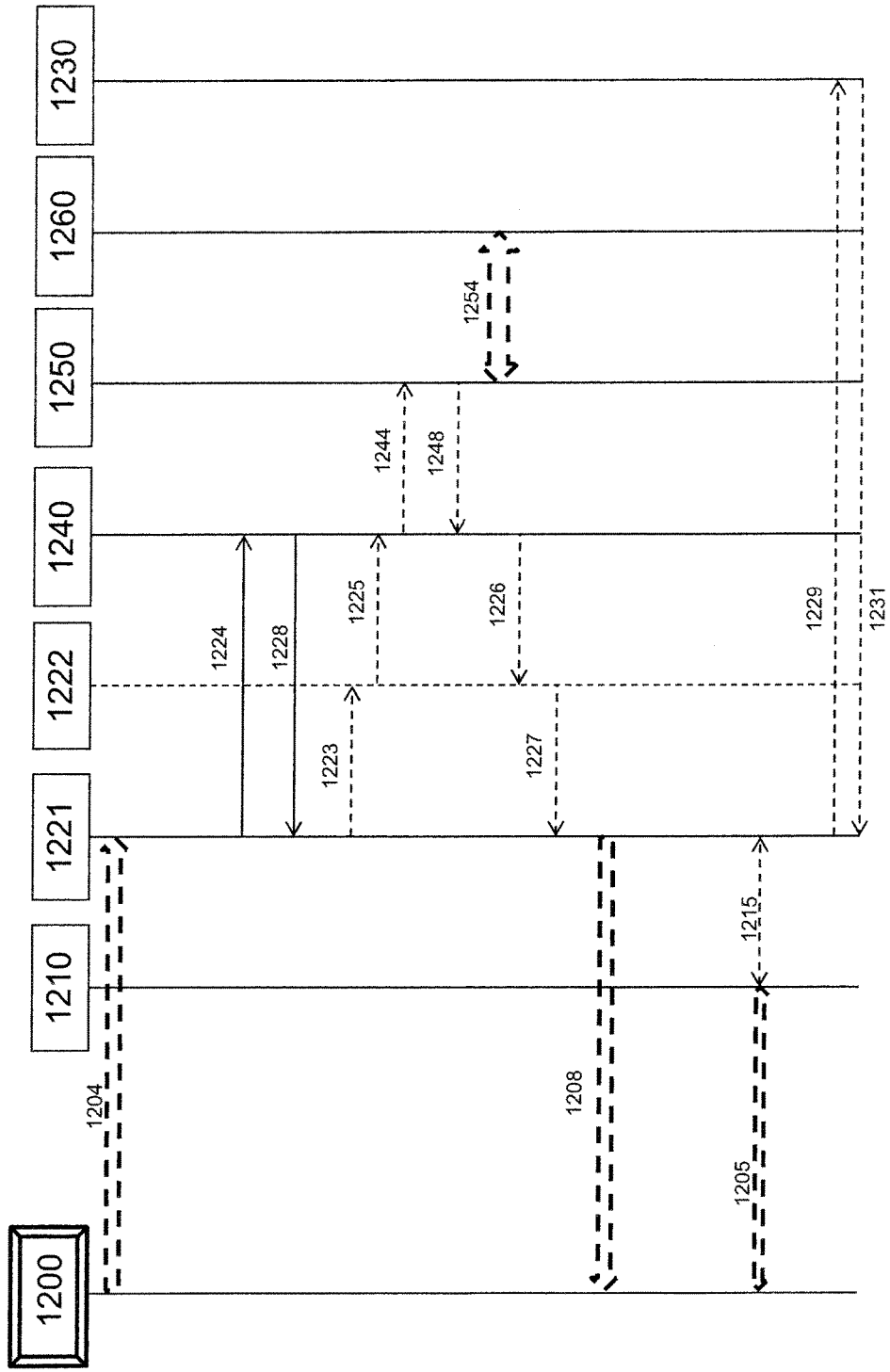
FIGS. 12a, b and c show procedures, according to some examples of the present invention, for device initiated deactivation of group and/or individual bearers, wherein the device may be camping on a E-UTRAN.

Detach procedures may also be initiated by devices attached to a network. These procedures may allow devices to inform networks that the devices may not need to access the networks. Such device initiated detach procedures are illustrated in FIGS. 12 and 13. In FIG. 12 are illustrated detach procedures for devices that may be camping on an E-UTRAN network. In FIGS. 12 a, b and c are illustrated examples of:

detach procedure initiated by the devices when no master device may be present;

detach procedure initiated by the devices when a master device may be present;

detach procedure initiated by a master device for the devices.

The detach procedures according to one embodiment of the present invention is illustrated in FIG. 12 a, wherein the detach procedure may be initiated by the devices 1200 by sending a detach request 1204 to an MME 1221. It may be noted that the device(s) 1200 intending to detach may belong to a group of devices having a group identity. In case of multiple devices to be detached, independent detach requests 1204 may be sent by each device 1200. Thus, if n devices 1200 are to be detached, n detach requests 1204 may be sent by the device 1200, one detach request to each of the n devices. Each of these detach requests may comprise a temporary identifier such as GUTI of the device.

Figure 12B:
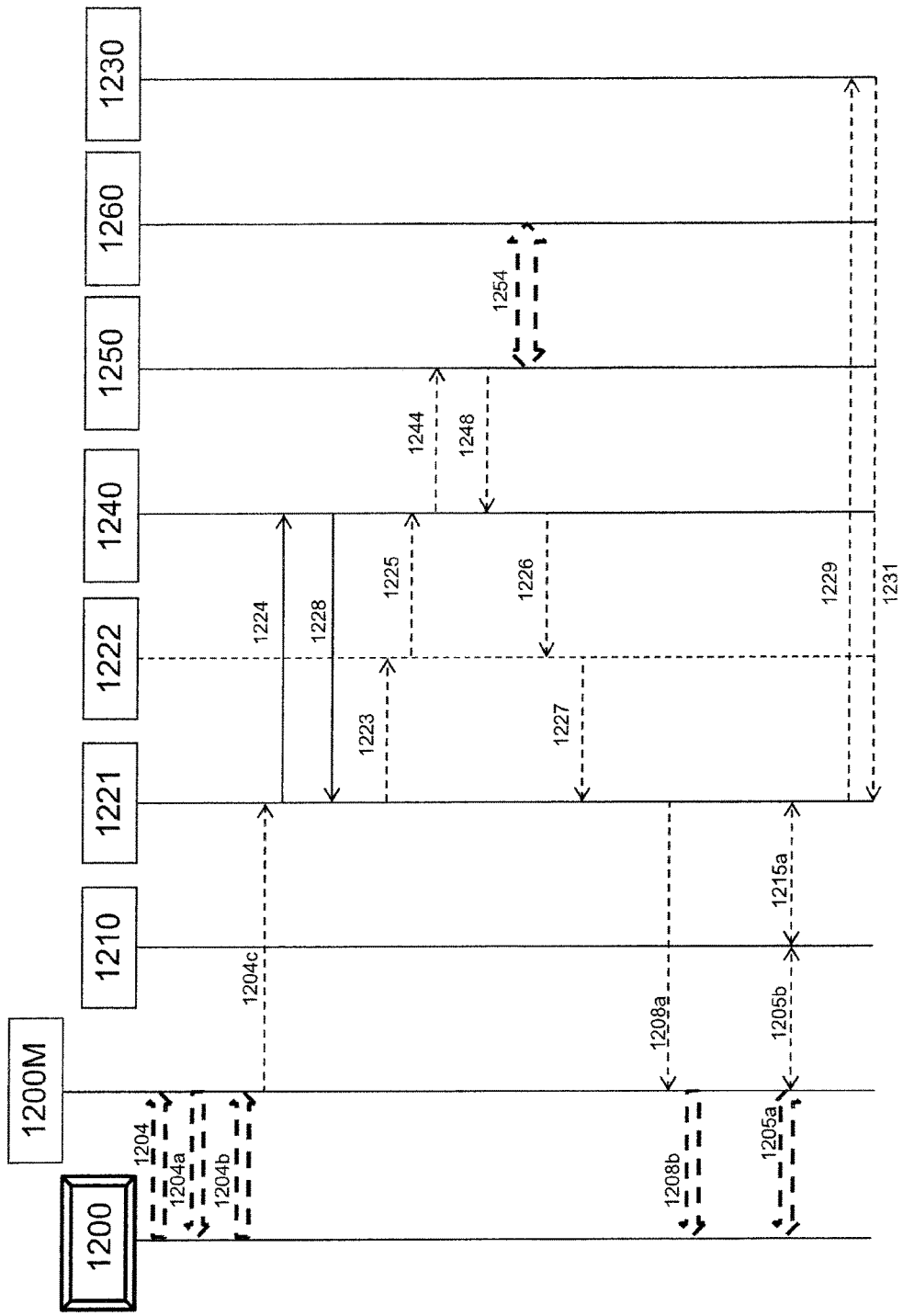
Figure 13A:
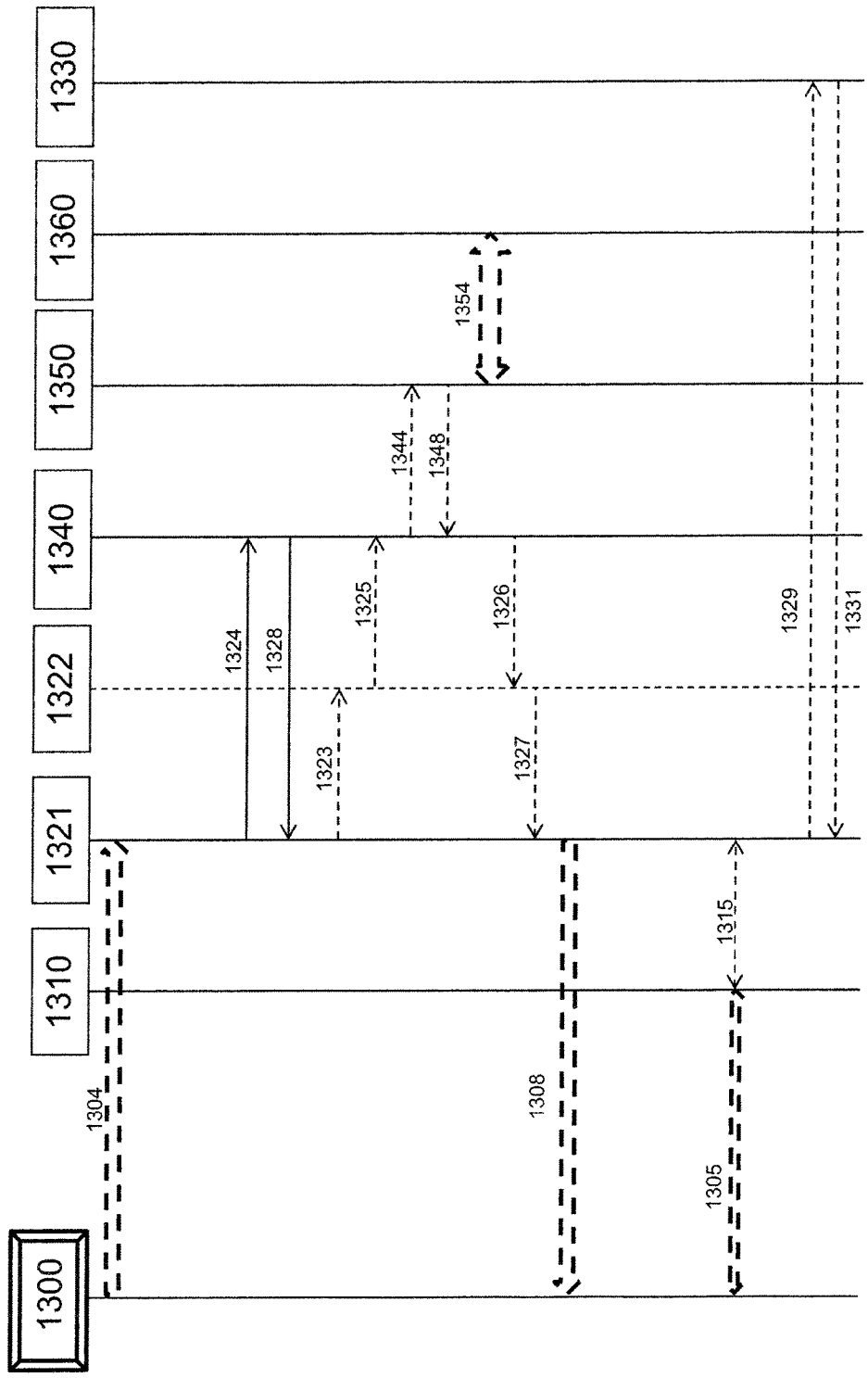
FIGS. 13a, b and c show procedures, according to some examples of the present invention, for device initiated deactivation of group and/or individual bearers, wherein the device may be camping on a GERAN/UTRAN.
Figure 13B:
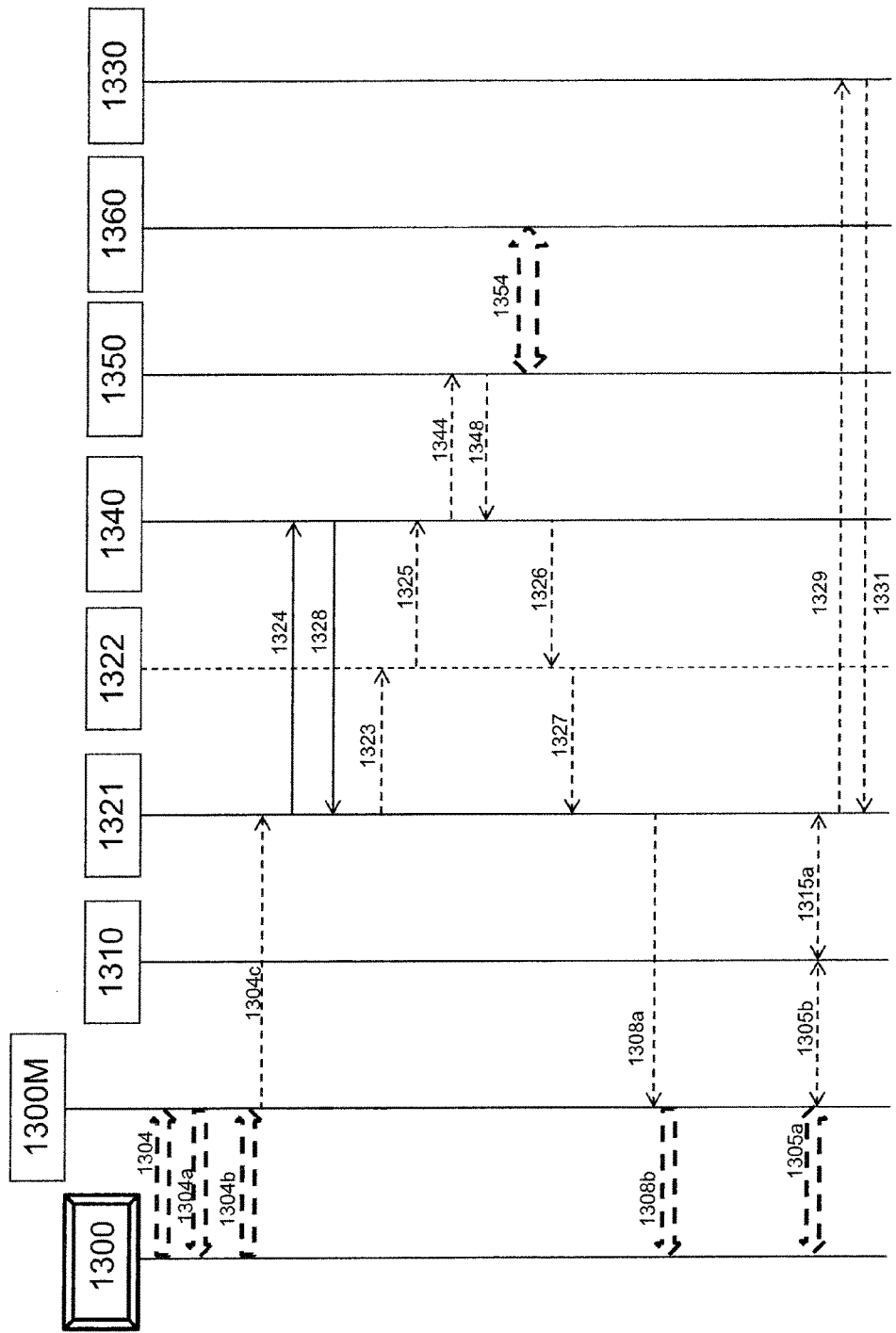
Figure 13C:
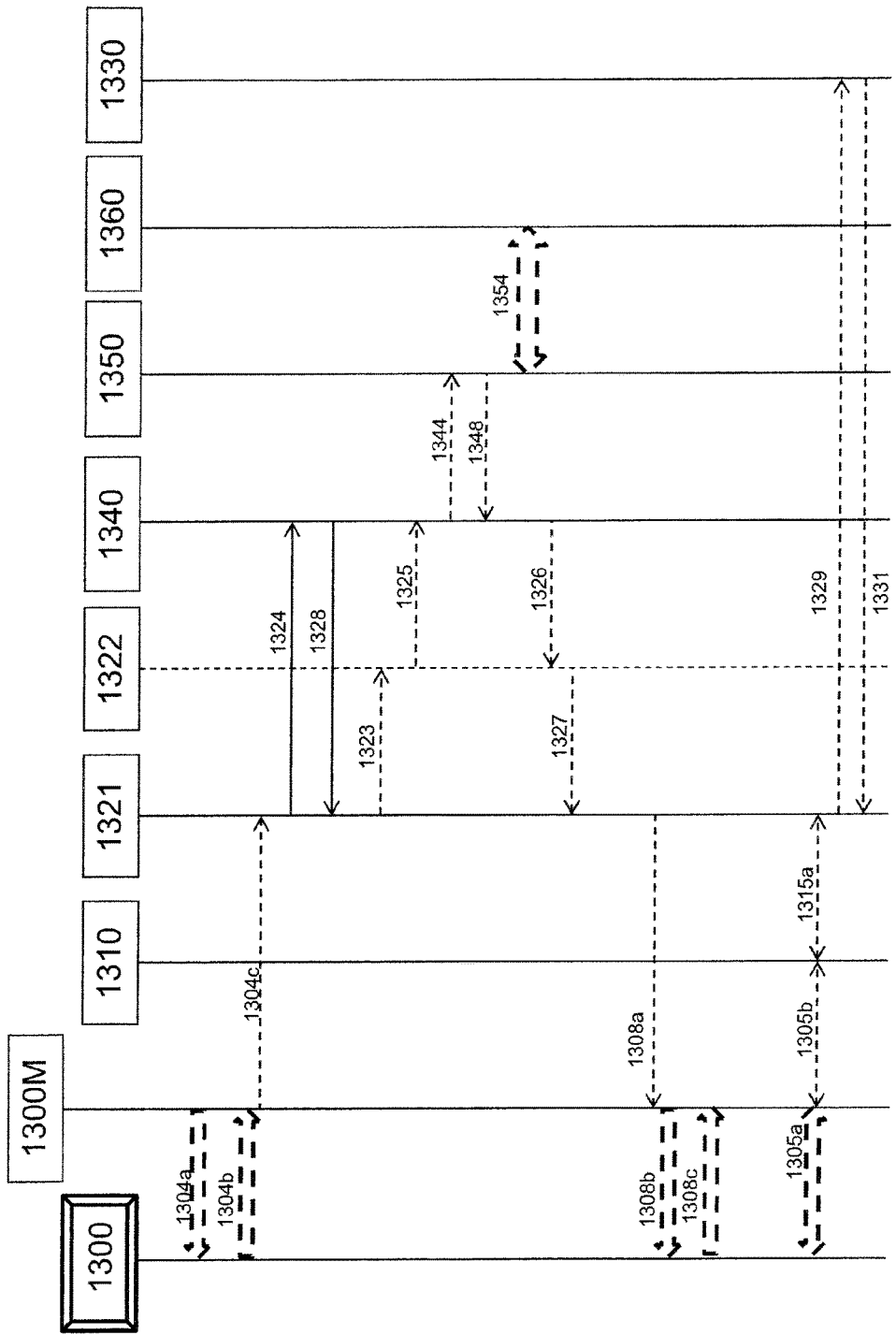

In an alternative embodiment of the present invention as illustrated in FIG. 12b, independent detach requests 1204 may be sent to a master device 1200M. The master device 1200M may transmit a request 1204a to the devices 1200 to be detached for the temporary identifiers (e.g., GUTI). The master device 1200M may receive responses 1204b comprising the temporary identifiers from the devices 1200. Subsequently, the master device 1200M may send a single detach request 1204c to the MME 1221, wherein the detach request 1204c may provide the temporary identities of the devices 1200 to be detached.

It may be noted that the master device 1200M may be responsible for communicating with the nodes in the network for the devices 1200. The master device 1200M may be a device belonging to the group of devices 1200 or alternatively may be a gateway device for the group of devices 1200. The communication between the master device 1200M and the devices 1200 belonging to the group of devices may be using a radio technology that may be different from GERAN/UTRAN/E-UTRAN technologies.

Figure 12C:
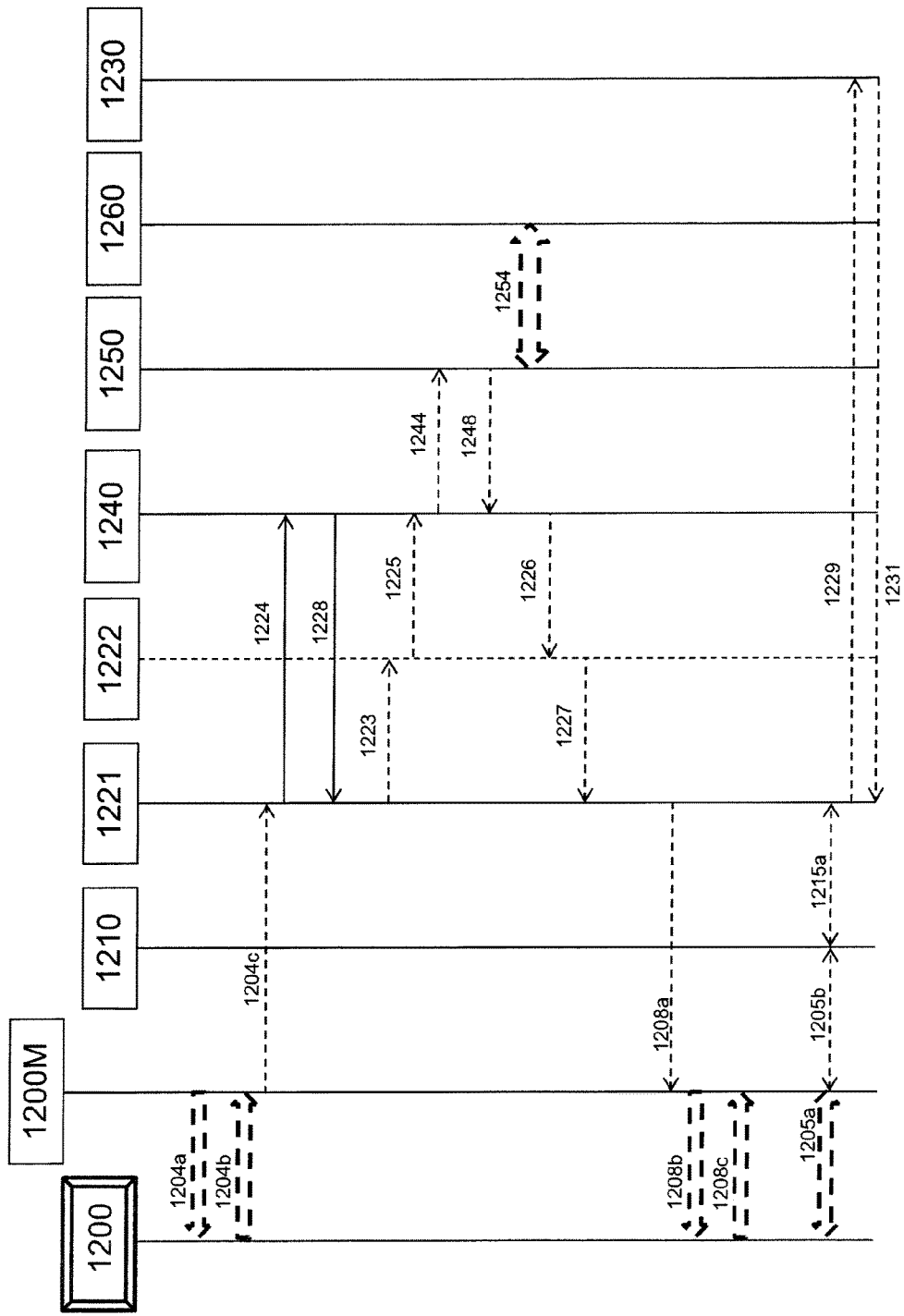

In yet another alternative embodiment of the present invention as illustrated in FIG. 12c, a master device 1200M may be responsible for communicating with the MME 1221. In such a case, the master device 1200M may initiate the detach procedure. For this, master device 1200M may transmit a request 1204a to the devices 1200 to be detached for temporary identifiers (e.g., GUTI) of the devices 1200. The master device 1200M may receive responses 1204b comprising the temporary identifiers from the devices 1200. Subsequently, the master device 1200M may send a single detach request 1204c to the MME 1221, wherein the detach request 1204c may provide the temporary identities of the devices 1200 to be detached. It may be noted that the master device 1200M may be a device belonging to the group of devices or may be a separate device such as a gateway device. The communication between the master device 1200M and the devices 1200 belonging to the group of devices may be using a radio technology that may be different from GERAN/UTRAN/E-UTRAN technologies.

In order to ensure that detach requests (e.g., 1204, 1204c) are not sent by fake devices or a fake master device, the MME 1221 may initiate verification procedures that may verify if the detach requests comprising the temporary identifiers are integrity protected or ciphered. If the detach requests are neither integrity protected nor ciphered, the MME 1221 may activate integrity protection. For this, the MME 1221 may request additional detach data comprising a list of temporary identifiers that may be integrity protected or ciphered. If such additional detach data is received, the MME 1221 may accept the detach requests. Otherwise, the MME 1221 may reject the detach request messages (e.g., 1204, 1204c).

The procedures in connection with messages 1224, 1228, 1223, 1225, 1244, 1248, 1254, 1226, 1227 may be similar to the corresponding ones in FIG. 10.

As shown in FIG. 12a, the MME 1221 may send a detach accept message 1208 to the devices to be detached 1200. If there are multiple devices to detached, the MME 1221 may send a detach accept message 1208 to each of the device 1200. Alternatively as shown in FIG. 12b, if a master device 1200M is present, the MME 1221 may send a single detach accept message 1208a to the master device 1200M. In turn, the master device 1200M may send detach accept messages 1208b to the devices 1200. In yet another alternative example as illustrated in FIG. 12c, MME 1221 may send a single detach accept message 1208a to the master device 1200M. The master device 1200M may send detach requests 1208b to the devices to be detached. The devices 1200 may respond with detach accept messages 1208c to the master device 1200M.

Signaling connections may be released using procedures similar to those described with reference to FIG. 10.

After the MME 1221 receives a delete session response 1228 from an S-GW 1240, if a subscription data indicates that the devices 1200 are allowed to perform a handover to a non-3GPP access, the MME 1221 may send a Notify Request 1229 to indicate that the HSS 1230 may remove the access point name (APN) and P-GW identity pairs for the devices 1200. The HSS 1230 may remove all APN and P-GW identity pairs that may be dynamically stored and may send a Notify Response 1231 to the MME 1221.

Referring to FIG. 13 (a, b and c), the devices may be camping on a GERAN or an UTRAN network. The detach procedure may be similar to that described with reference to FIG. 12 a, b and c, except that the detach requests 1304 or 1304c from the devices 1300 or the master device 1300M respectively may be received by an SGSN 1321.

Similar to the security procedures described in connection with FIG. 12, the SGSN 1321 may initiate verification procedures that may verify if the detach requests comprising the temporary identifiers are integrity protected or ciphered. If the detach requests are neither integrity protected nor ciphered, the SGSN 1321 may activate integrity protection. For this, the SGSN 1321 may request additional detach data comprising a list of temporary identifiers that may be integrity protected or ciphered. If such additional detach data is received, the SGSN 1321 may accept the detach requests. Otherwise, the SGSN 1321 may reject the detach request messages (e.g., 1304, 1304c).

The procedures in connection with messages 1324, 1328, 1323, 1325, 1344, 1348, 1354, 1326, 1327 may be similar to the corresponding ones in FIG. 11.

The procedures in connection with detach accept may be similar to those described with reference to FIG. 12, except that an SGSN 1321 is involved, instead of an MME 1322.

Signaling connections may be released using procedures similar to those described with reference to any of FIGS. 10-12.

After the SGSN 1321 receives a delete session response 1328 from an S-GW 1340, if a subscription data indicates that the devices 1300 are allowed to perform a handover to a non-3GPP access, the SGSN 1321 may send a Notify Request 1329 to indicate that the HSS 1330 may remove the access point name (APN) and P-GW identity pairs for the devices 1300. The HSS 1330 may remove all APN and P-GW identity pairs that may be dynamically stored and may send a Notify Response 1331 to the SGSN 1321.

Figure 14A:
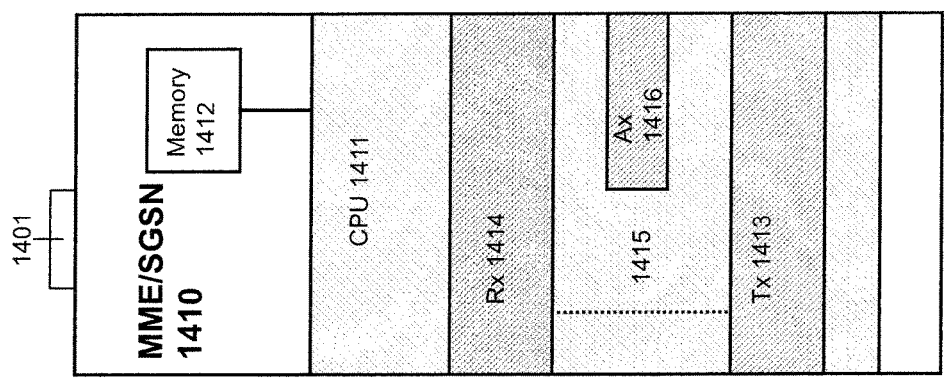
FIGS. 14a, b and c show apparatuses and a system, according to some examples of the present invention, for activation and deactivation of individual and/or group bearer.
Figure 14B:
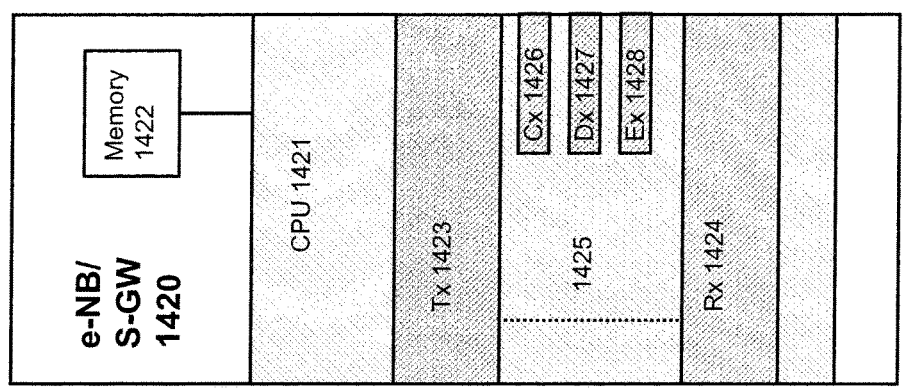

The present invention provides a first apparatus 1410 (FIG. 14a) and second apparatus 1420 (FIG. 14b) for activation and deactivation of bearers for a group of devices. The bearers may transmit user data for the group of devices.

The first apparatus 1410 may comprise a control node in a communication network. Examples of the first apparatus 1410 may be:
mobility management entity (MME); and
serving GPRS support node (SGSN).

The second apparatus 1420 may be a network element that may be involved in transmitting user data and may interface with a control node such as the first apparatus 1410. Examples of the second apparatus 1420 may be:
base station systems (BSS);
radio Network Controller (RNC);
enhanced node B (e-NB); and
serving gateway (S-GW).

Figure 14C:
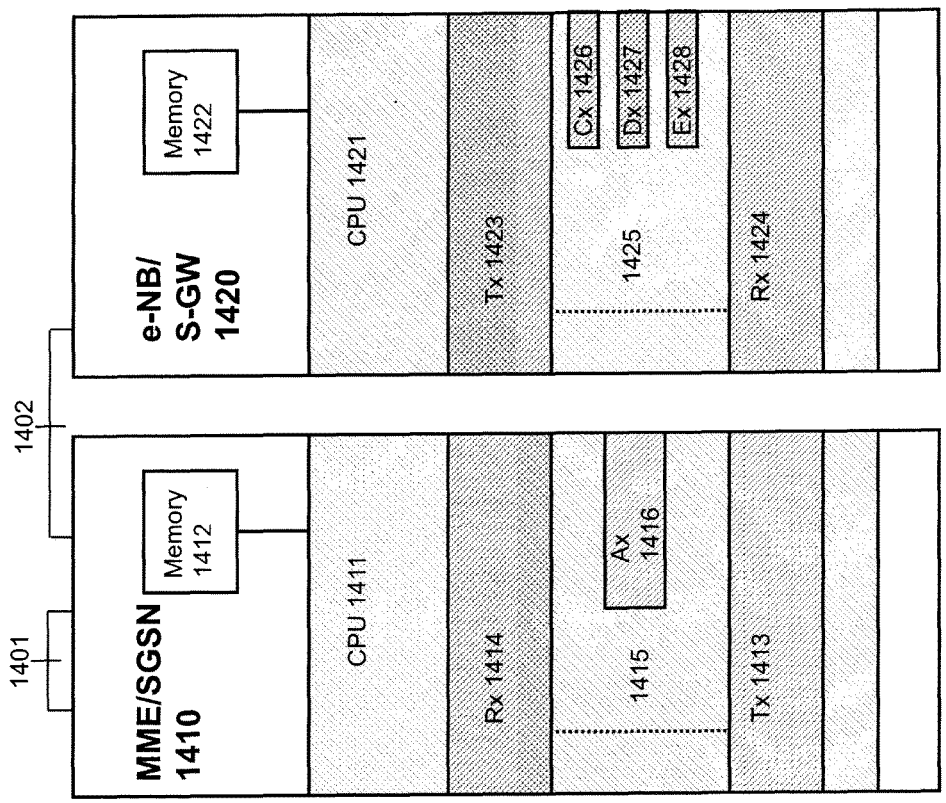

The first apparatus 1410 and the second apparatus 1420 may exchange messages over an interface 1402 (FIG. 14c). Examples of such interfaces are S1-C, S11, Iu, Gb, S4 as defined by 3GPP. Further, a first apparatus 1410 may interconnect with another first apparatus 1410 over an interface 1401, which may be a S10 or S16 interface defined by 3GPP.

The first apparatus (MME/SGSN) 1410 in accordance with the present invention may provide a mobility management entity or a serving GPRS support node, enhanced with the features of the invention. The apparatus 1410 may comprise a Central Processing Unit (CPU or a core functionality) 1411, a memory 1412, a means for receiving (Rx) or an input unit that may be configured to receive messages 1414, a means for transmitting (Tx) or an output unit that may be configured to transmit messages 1413 and a means for allocating (Ax) or an allocating unit that may be configured to allocate e.g., bearer identities 1416. According to some examples, the first apparatus may further comprise a means for verifying or a verifying unit that may be configured to verify e.g., if a bearer identity has been previously allocated. The means for verifying is not shown in FIG. 14a for sake of simplicity. The means for verifying may be a stand-alone unit, according to one implementation. Alternatively, the means for verifying may be implemented as part of the means for allocating 1416. In a yet another alternative implementation, the means for verifying may be provided by a combination of the means for receiving 1414 and the means for transmitting 1413.

The means for receiving 1414 and means for transmitting 1413 may exchange information over an internal interface 1415. Similarly, there may be interfaces between the means for allocating 1416 and the means for receiving 1414 and between the means for allocating 1416 and the means for transmitting 1413 (not shown in FIG. 14 for sake of simplicity).

The means for receiving Rx 1414, the means for transmitting 1413 and the means for allocating 1416 of the apparatus 1410 may be functionalities running on the CPU 1411 of the apparatus, or may alternatively be separate functional entities or means.

The CPU 1411 may be configured to process various data inputs and to control the functions of the memory 1412, the means for receiving 1414, the means for transmitting 1413 and the means for allocating 1416. The memory 1412 may serve e.g. for storing code means for carrying out e.g. the methods according to the examples of the present invention, when run e.g. on the CPU 1411. The memory 1412 may, according to examples of the present invention, store identities of bearers, identities of devices and/or a group of devices. Further, the memory 1412 store addresses of network entities that may be present in a network, e.g., an EPS network, an UMTS network and a GPRS network.

It may be noted that the means for receiving 1414 and the means for transmitting 1413 may alternatively be provided as integral transceivers. It may further be noted that the means for receiving 1414 and the means for transmitting 1413 may be implemented i) as physical transmitters/receivers for transceiving e.g. via the air interface, ii) as routing entities e.g. for sending/receiving data packets e.g. in a PS (packet switched) network, or, iii) as any suitable combination of i) and ii).

According to one aspect of the invention, the means for receiving 1414, according to examples of the present invention, may receive an attach request for a device that may belong to a group of devices. This may trigger the means for transmitting 1413 to send a request for obtaining an identity of the group of devices to, for example, a home subscriber server. The means for receiving 1414 may receive a response for this request that may comprise an identity of the group of devices. Upon obtaining the identity of the group of devices, the means for allocating 1416 may allocate a first bearer identity for the group of devices. The first bearer identity may be stored in the memory 1412.

According to some examples of the present invention, the means for verifying may verify if a bearer identity has been previously allocated for the group of devices. If may do so by checking if a bearer identity for the group of devices is stored in the memory 1412. If the result of the verifying is positive, i.e., if a bearer identity has been previously allocated to the group of devices, the means for allocating 1416 may allocate the previously allocated bearer identity as the first bearer identity for the group of devices.

Alternatively, a combination of the means for receiving 1414 and the means for transmitting 1413 may verify if a bearer identity has been previously allocated for the group of devices. For this, the means for transmitting 1413 may transmit a message to a network entity, e.g., an MME, an SGSN or an S-GW, requesting any previously allocated bearer identity. If a bearer identity has been previously allocated, the means for receiving 1414 may receive such bearer identity in a response message. Subsequently, the means for allocating 1416 may allocate this previously allocated bearer identity as the first bearer identity for the group of devices.

The means for transmitting 1413 may transmit, e.g., as part of a create session request and/or attach accept message, the first bearer identity along with the identity of the group of devices to at least one network entity involved in transmitting user data for the group of devices. If a bearer identity different from the allocated first bearer identity for the group of devices (that may be part of the create session request) has been previously allocated, e.g., by an MME, the means for receiving 1414 may receive an indication of this from the at least one network entity. This indication may be part of a create session response or may be part of a notification message. The means for allocating 1416 may perform a re-allocation of bearer identity by allocating this previously allocated bearer identity as the first bearer identity for the group of devices. Further, the memory 1412 may be updated with the re-allocated bearer identity. The means for transmitting 1413 may send a updated create session request comprising the re-allocated bearer identity to the at least one network entity.

The means for receiving 1414 may also obtain an identity of the device from the home subscriber server. The means for allocating 1416 may allocate a second bearer identity for the device. The means for transmitting 1413 may transmit, e.g., as part of a create session request and/or attach accept message, the identity of the device and the second bearer identity to at least one network entity involved in transmitting user data for the device.

It may be noted that the means for receiving 1414 may receive the first and/or second bearer identity from another first apparatus 1410 over the interface 1401 and the means for allocating 1416 may allocate the first and/or second bearer identity to a group of devices and/or a device respectively.

According to another aspect of the invention, the means for receiving 1414 may receive at least one request to detach at least one device that may belong to a group of devices. According to an example of the present invention, there may be one request to detach per device belonging to the group of devices. Thus, if there are n devices to be detached, there may be n requests to detach. According to another example of the present invention, there may be master device that may be responsible for communicating the requests to detach for the n devices. In this case, there may be a single request to detach providing the identities of the n devices. Alternatively, if there exists a group identity for the n devices, the request to detach may comprise the group identity.

Upon receipt of the request to detach by the means for receiving 1414, the means for transmitting 1413 may transmit a request to delete a session for the at least one device. It may be noted that there may be a single request to delete a session, even if there are a plurality of devices to be detached. The request to delete may comprise at least one bearer identity. If there exists a group bearer for the devices, the bearer identity may be for the group bearer. If there are individual bearers for the devices, the request to delete a session may comprise the identities of the individual bearers.

According to yet another aspect of the invention, the means for transmitting 1413 may transmit at least one request to detach at least one device that may belong to a group of devices. According to an example of the present invention, there may be one request to detach per device belonging to the group of devices. Thus, if there are n devices to be detached, there may be n requests to detach. According to another example of the present invention, there may be master device that may be responsible for communicating the requests to detach for the n devices. In this case, there may be a single request to detach providing the identities of the n devices that may be required to detach.

Subsequent to transmitting the request to detach, the means for transmitting 1413 may further transmit a request to delete a session for the at least one device. It may be noted that there may be a single request to delete a session, even if there are a plurality of devices to be detached. The request to delete a session may comprise at least one bearer identity. If there exists a group bearer for the devices, the bearer identity may be for the group bearer. If there are individual bearers for the devices, the request may comprise identities of the individual bearers.

FIG. 14 shows an example of a second apparatus 1420 in accordance with the present invention. Examples of the second apparatus according to the present invention may be an enhanced node B (eNB) and a serving gateway (S-GW), enhanced with the features of the invention.

The apparatus 1420 may comprise a Central Processing Unit (CPU or a core functionality) 1421, a memory 1422, a means for receiving Rx or an input unit configured to receive messages 1424, a means for transmitting Tx or an output unit configured to transmit messages 1423, a means for creating Cx or a creating unit configured to create e.g., bearers 1426, a means for defining Dx or a defining unit configured to define e.g., parameters for a group of devices 1427 and a means for deactivating Ex or a deactivating unit configured to deactivate e.g., bearers 1428. As shown in the figure, the means for receiving 1424 and means for transmitting 1423 may exchange information over an internal interface 1425. Similarly, interfaces may exist between any two of the means for receiving Rx 1424, means for transmitting Tx 1423, means for creating Cx 1426, means for defining Dx 1427 and means for deactivating Ex 1428. These interfaces are not shown in the figure for sake of simplicity.

The means for receiving Rx 1424, the means for transmitting Tx 1423, the means for creating Cx 1426, the means for defining Dx 1427 and the means for deactivating 1428 of the apparatus 1420 may be functionalities running on the CPU 1421 of the apparatus, or may alternatively be separate functional entities or means.

The CPU 1421 may be configured to process various data inputs and to control the functions of the memory 1422, the means for receiving Rx 1424, the means for transmitting Tx 1423, the means for creating Cx 1426, the means for defining Dx 1427 and the means for deactivating Ex 1428. The memory 1422 may serve e.g. for storing code means for carrying out e.g. the methods according to the examples of the present invention, when run e.g. on the CPU 1421. The memory 1422 may, according to examples of the present invention, store bearer table mapping bearer identities with identities of devices and/or group of devices.

It may be noted that the means for receiving 1424 and the means for transmitting 1423 may alternatively be provided as integral transceivers. It may further be noted that the means for receiving 1424 and the means for transmitting 1423 may be implemented i) as physical transmitters/receivers for transceiving e.g. via the air interface, ii) as routing entities e.g. for sending/receiving data packets e.g. in a PS (packet switched) network, or, iii) as any suitable combination of i) and ii).

According to one aspect of the present invention, the means for receiving 1424 may receive, as part of a create session request or attach accept message, an identity of a group of devices and a bearer identity. Using these, the means for creating 1426 may create a bearer for transmission of user data for the group devices. It may be noted that the bearer may be a group bearer or an individual bearer. The means for transmission 1423 may transmit messages such as create session request, creation session response etc. As noted earlier, the apparatus 1420 may comprise a means for defining 1427 that may assign a tunnel end point identifier, which may be transmitted by the means for transmitting 1423 to network entities. The means for defining 1427 may also define an aggregate maximum bit rate for the bearer created by the means for creating 1426. The means for defining 1427 may further define a charging identifier for the group of devices.

According to another aspect of the invention, the means for receiving 1424 may receive a delete session request that may comprise identities of at least one device that may be required to detach from a network and at least one bearer identity for the at least one device.

Alternatively, if a group identity exists for the devices to be detached, the delete session request may comprise the group identity. The bearer identity may be an identity of a group bearer or alternatively be identities of the individual bearers of the devices. Upon receipt of the delete session request, the means for deactivating 1428 may deactivate the bearer based on the bearer identity received in the delete session request.

If the bearer identity mapped to an individual bearer, the means for deactivating 1428 may deactivate the individual bearer. If the bearer identity mapped to a group bearer and the delete session request comprised identities of all the devices of the group (associated with the group bearer), then the group bearer may be deactivated by the means for deactivating 1428. If, on the other hand, the bearer identity mapped to a group bearer and the delete session request comprised identities of only a sub-set of the group of devices, the group bearer may not be deactivated by the means for deactivating 1428. In such a case, a mapping that be stored in the memory 1422 between the devices to be detached and the group bearer may be removed.

The present invention also provides a third apparatus (not shown in FIG. 14), that may be a master device. The master device may be involved in establishing a group bearer and/or in the detachment procedure for a group of devices. The master device may be a device belonging to the group of devices. Alternatively, the master device may be a gateway for the group of devices. The master device may provide functions such as communicating a control node, e.g, MME, SGSN etc, in a network for the group of devices.

According to one embodiment of the present invention, the third apparatus may comprise a means for receiving or an input unit configured to receive a detach request from a control node such as MME/SGSN. The detach request may comprise identities of devices that need to be detached. The apparatus may further comprise a means for forwarding or a forwarding unit configured to forward the detach request to the devices that need to be detached.

In an alternative embodiment, the third apparatus may initiate a detach process for the devices. In such case, the apparatus may comprise a means for transmitting or an output unit configured to transmit a request to the devices to be detached, requesting the temporary identities of the devices. Such temporary identities may comprise global unique temporary identities (GUTI). The means of receiving may receive the temporary identities from the devices. The means to transmit may further transmit a detach request to a control node such as MME or SGSN for the devices. The detach request may comprise the temporary identities of the devices to be detached. It may be noted that there may be a single detach request even if there are a plurality of devices to be detached.

The first apparatus 1410 and the second apparatus 1420 may together further provide a system 1400 (FIG. 14c) for activation and deactivation of bearers for a group of devices. The system 1400, according to some examples of the present invention, may also comprise a third apparatus (not shown in FIG. 14). According to some examples of the present invention, it may be possible that the system 1400 may comprise a combination of MME's and SGSN's forming a plurality of first apparatuses 1410. In such a case, an SGSN may have a S3 interface with an MME, as defined by 3GPP.

The present invention may further relate to a computer program product. The computer program product may comprise code means for performing the procedures of bearer creation, bearer deactivation and detachment of devices, for example, as described with reference to FIGS. 9-13.

Although the present invention has been described herein before with reference to particular embodiments thereof, the present invention is not limited thereto and various modifications can be made thereto. For example:

the procedures described herein may be extended to any network, wherein bearers may be created and/or deactivated for transmission of user traffic; and the procedures may be extended to Packet Data Protocol (PDP) contexts.

The invention claimed is:

1. A method comprising:
receiving an attach request for at least one device belonging to a group of devices;
obtaining an identity of the group of devices;
allocating a first bearer identity for the group of devices;
sending a create session request to a serving gateway to cause the serving gateway to check, upon receipt of the create session request, if a bearer already exists for the group of devices with the allocated first bearer identity, and in response to the checking indicating that the bearer for the group of devices with the allocated first bearer identity already does not exist, to cause the serving gateway to create a bearer, and then to cause the serving gateway to send a create session request to a packet gateway; and
sending, via a mobility management entity, a delete session request towards the serving gateway for the group of devices to be detached in order for the serving gateway to deactivate a group bearer.

2. The method of claim 1, wherein the first bearer identity comprises a new bearer identity for the group of devices.

3. The method of claim 1, wherein the first bearer identity comprises a previously allocated bearer identity for the group of devices.

4. The method of claim 3, wherein the previously allocated bearer identity comprises a bearer identity allocated upon receiving an attach request for another device belonging to the group of devices.

5. The method of claim 4, wherein the bearer identity allocated comprises a bearer identity allocated by a first control node, wherein the first control node comprises a control node receiving the attach request for the at least one device.

6. The method of claim 4, wherein the bearer identity allocated comprises a bearer identity allocated by a second control node, wherein the second control node comprises a control node receiving the attach request for the other device, the second control node being present in addition to a first control node.

7. The method of claim 6 further comprising obtaining the previously allocated bearer identity from the second control node.

8. The method of claim 6, wherein at least one of the first and second control nodes comprises any of a mobility management entity and a serving general packet radio service support node.

9. The method of claim 3 further comprising obtaining the previously allocated bearer identity from a first network element, wherein the first network element is involved in a transmission of user data of the group of devices.

10. The method of claim 1, wherein the attach request is used to obtain the identity of the group of devices.

11. The method of claim 1, wherein following receiving the attach request, the identity of the group of devices is obtained from a home subscriber server.

12. The method of claim 1, wherein the attach request is received from the at least one device.

13. The method of claim 1, wherein the attach request is received from a master device responsible for communicating to at least one of a first and a second control node for the group of devices.

14. The method of claim 1 further comprising:
sending the identity of the group of devices and the first bearer identity to a first network element.

15. An apparatus comprising:
at least one memory including computer program instructions; and
at least one processor,
wherein the at least one memory and computer program instructions are configured to, with the at least one processor, cause the apparatus at least to
receive an attach request for at least one device belonging to a group of devices;
obtain an identity of the group of devices;
allocate a first bearer identity for the group of devices;
send a create session request to a serving gateway to cause the serving gateway to check, upon receipt of the create session request, if a bearer already exists for the group of devices with the allocated first bearer identity, and in response to the checking indicating that the bearer for the group of devices with the allocated first bearer already does not exist, to cause the serving gateway to create a bearer, and then to cause the serving gateway to send a create session request to a packet gateway; and
send, via a mobility management entity, a delete session request towards the serving gateway for the group of devices to be detached in order for the serving gateway to deactivate a group bearer.

16. A system comprising at least one apparatus according to claim 15.

17. A computer program, embodied on a non-transitory computer readable medium, comprising code means for performing method steps, when run on a processing means or module, the method steps comprising:
receiving an attach request for at least one device belonging to a group of devices;

obtaining an identity of the group of devices;

allocating a first bearer identity for the group of devices;

sending a create session request to a serving gateway to cause the serving gateway to check, upon receipt of the create session request, if a bearer already exists for the group of devices with the allocated first bearer identity, and in response to the checking indicating that the bearer for the group of devices with the allocated first bearer identity already does not exist, to cause the serving gateway to create a bearer, and then to cause the serving gateway to send a create session request to a packet gateway; and sending, via a mobility management entity, a delete session request towards the serving gateway for the group of devices to be detached in order for the serving gateway to deactivate a group bearer.

* * * * *